US011196877B2

(12) United States Patent
Fukushi

(10) Patent No.: US 11,196,877 B2
(45) Date of Patent: Dec. 7, 2021

(54) IMAGE FORMING APPARATUS INCLUDES AN ANTENNA TO ESTABLISHE WIRELESS COMMUNICATE WITH PORTABLE TERMINAL AND DISPLAY PANEL FOR GUIDING USER

(71) Applicant: CANON KABUSHIKI KAISHA, Tokyo (JP)

(72) Inventor: Kenji Fukushi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/944,259

(22) Filed: Jul. 31, 2020

(65) Prior Publication Data

US 2021/0084177 A1 Mar. 18, 2021

(30) Foreign Application Priority Data

Sep. 13, 2019 (JP) .............................. JP2019-167789

(51) Int. Cl.
*H04N 1/00* (2006.01)
*H04W 12/47* (2021.01)

(52) U.S. Cl.
CPC ..... *H04N 1/00307* (2013.01); *H04N 1/00384* (2013.01); *H04N 1/00424* (2013.01); *H04N 1/00482* (2013.01); *H04N 2201/006* (2013.01); *H04N 2201/0094* (2013.01); *H04W 12/47* (2021.01)

(58) Field of Classification Search
None
See application file for complete search history.

(56) References Cited

U.S. PATENT DOCUMENTS

| 8,731,469 | B2 * | 5/2014 | Tokunaga | .......... H04N 1/00461 455/41.2 |
| 10,148,833 | B2 | 12/2018 | Nakayama | |
| 10,530,944 | B2 | 1/2020 | Nakayama | |
| 10,701,224 | B2 | 6/2020 | Nakayama | |
| 2013/0128298 | A1 * | 5/2013 | Yamada | ............. G03G 15/5004 358/1.13 |

(Continued)

FOREIGN PATENT DOCUMENTS

| EP | 3122029 A1 | 1/2017 |
| JP | 2017-196747 | 11/2017 |

OTHER PUBLICATIONS

European Office Action dated Jan. 11, 2021 in corresponding European application No. 20190005.7.

*Primary Examiner* — Haris Sabah
(74) *Attorney, Agent, or Firm* — Venable LLP

(57) ABSTRACT

An image forming apparatus for authenticating a portable terminal by near field wireless communication with the portable terminal includes an image forming portion configured to form an image on a sheet, and an operating portion configured to receive an operation by an operator. The operating portion includes a display panel capable of displaying information on image formation in response to authentication of the portable terminal and includes therein an antenna for establishing the near field wireless communication with the portable terminal. The display panel is capable of displaying a guide screen for guiding an operator so as to hold the portable terminal over the display panel.

14 Claims, 19 Drawing Sheets

(56) References Cited

U.S. PATENT DOCUMENTS

| | | | |
|---|---|---|---|
| 2014/0376050 A1* | 12/2014 | Baba | H04N 1/00307 |
| | | | 358/1.15 |
| 2015/0022081 A1 | 1/2015 | Li | |
| 2015/0062853 A1 | 3/2015 | Li | |
| 2016/0255238 A1* | 9/2016 | Saito | H04W 4/80 |
| | | | 358/1.13 |
| 2016/0255245 A1* | 9/2016 | Ishibashi | H04W 8/22 |
| | | | 358/1.14 |
| 2017/0026530 A1* | 1/2017 | Sawada | H04N 1/00411 |
| 2017/0302335 A1* | 10/2017 | Sawata | H04B 5/02 |
| 2017/0310836 A1 | 10/2017 | Nakayama | |
| 2019/0037089 A1 | 1/2019 | Nakayama | |
| 2019/0335046 A1 | 10/2019 | Nakayama | |
| 2019/0384537 A1* | 12/2019 | Arai | G06F 3/1231 |
| 2020/0288026 A1 | 9/2020 | Nakayama | |

* cited by examiner (a)

(b)

IMAGE FORMING APPARATUS INCLUDES AN ANTENNA TO ESTABLISHE WIRELESS COMMUNICATE WITH PORTABLE TERMINAL AND DISPLAY PANEL FOR GUIDING USER

FIELD OF THE INVENTION AND RELATED ART

The present invention relates to an image forming apparatus, such as a copying machine or a printer, capable of near field wireless communication with a portable terminal.

There are image forming apparatuses capable of the near field wireless communication represented by NFC (near field communication) as a communication type. In recent years, there are portable terminals, such as smartphones and tablets, provided with a reader/writer for the near field wireless communication, and a technique capable of executing various authentications from these portable terminals and capable of carrying out operation output operation of the image forming apparatus from the portable terminal has been spreading.

In an image forming apparatus disclosed in Japanese Laid-Open Patent Application (JP-A) 2017-196747, a detecting portion for NFC is provided outside a touch panel (display panel) for receiving an operation of an operator such as an operating person or a service person. In the detecting portion, an antenna coil for carrying out NFC communication is provided. Further, in the detecting portion, a cross mark which is a target for holding the portable terminal over the detecting portion is printed on the detecting portion. In response to holding of the portable terminal over the detecting portion with the cross mark as a sign (target) by the operator, the image forming apparatus performs authentication of the operator.

Thus, in the case where a constitution in which the detecting portion is disposed outside of the display panel is employed, the operator holds the portable terminal over the display panel with the cross mark, as the sign, printed on the detecting portion. On the other hand, in the case where a constitution in which the antenna coil and the display panel are disposed so as to overlap with each other is employed, a position over which the operator holds the portable terminal is the display panel, but the display panel is a place where information on image formation such as a print condition is displayed, and therefore, the operator does not recognize the position over which the operator holds the portable terminal.

SUMMARY OF THE INVENTION

According to an aspect of the present invention, there is provided an image forming apparatus for authenticating a portable terminal by near field wireless communication with the portable terminal, the image forming apparatus comprising: an image forming portion configured to form an image on a sheet; and an operating portion configured to receive an operation by an operator, wherein the operating portion includes a display panel capable of displaying information on image formation in response to authentication of the portable terminal and includes therein an antenna configured to establish the near field wireless communication with the portable terminal, and wherein the display panel is capable of displaying a guide screen for guiding an operator so as to hold the portable terminal over the display panel.

Further features of the present invention will become apparent from the following description of exemplary embodiments with reference to the attached drawings.

Figure 8:
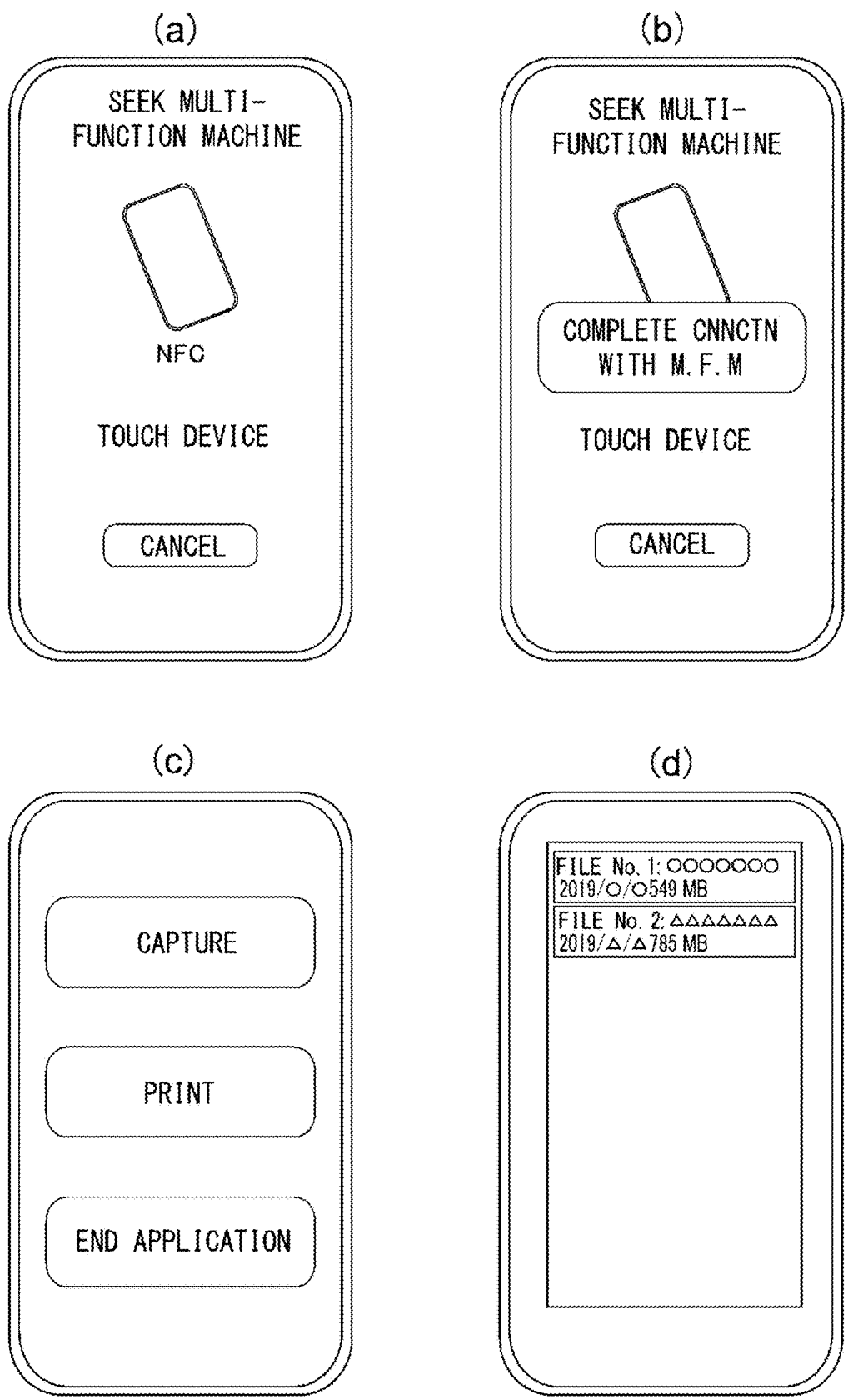

Parts (a) to (d) of FIG. 8 are schematic views for illustrating an application used in the portable terminal for performing the NFC.

Figure 9:
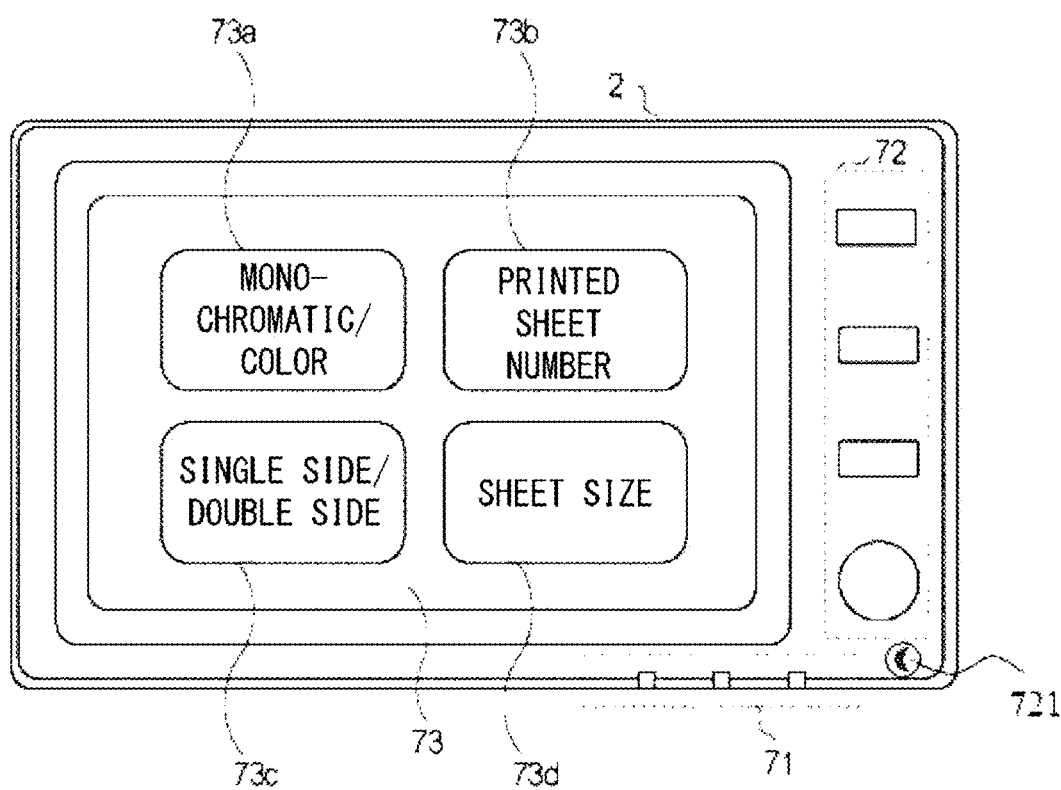

FIG. 9 is an example of information on image formation displayed on a display panel.

Figure 10:
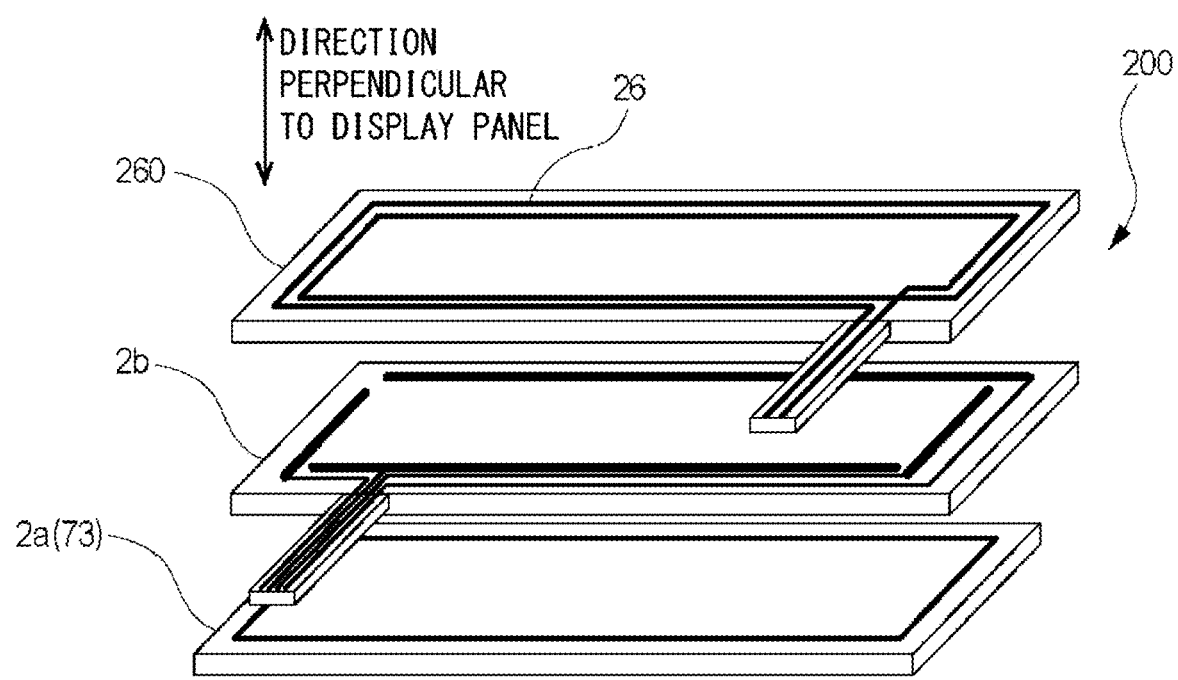

FIG. 10 is a schematic view for illustrating a structure of an operating portion.

Figure 11:
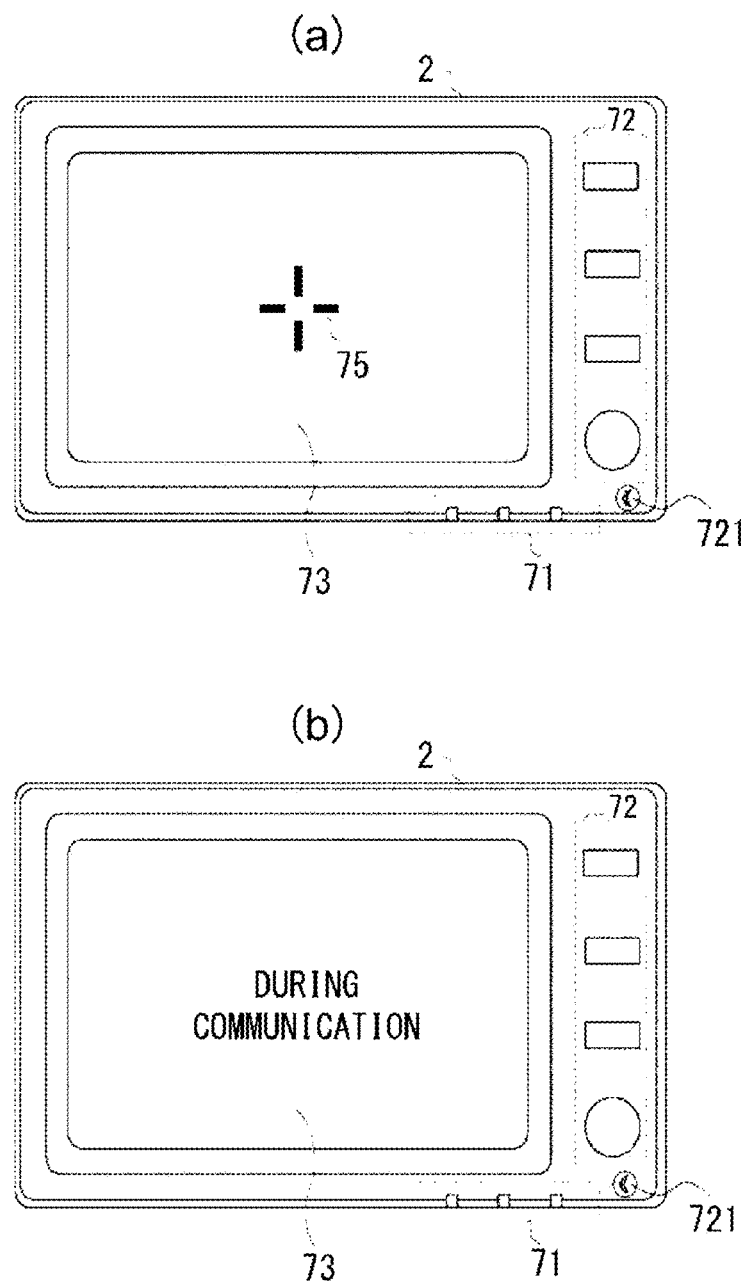

Parts (a) and (b) of FIG. 11 are schematic views for illustrating a screen displayed on the display panel.

Figure 12:
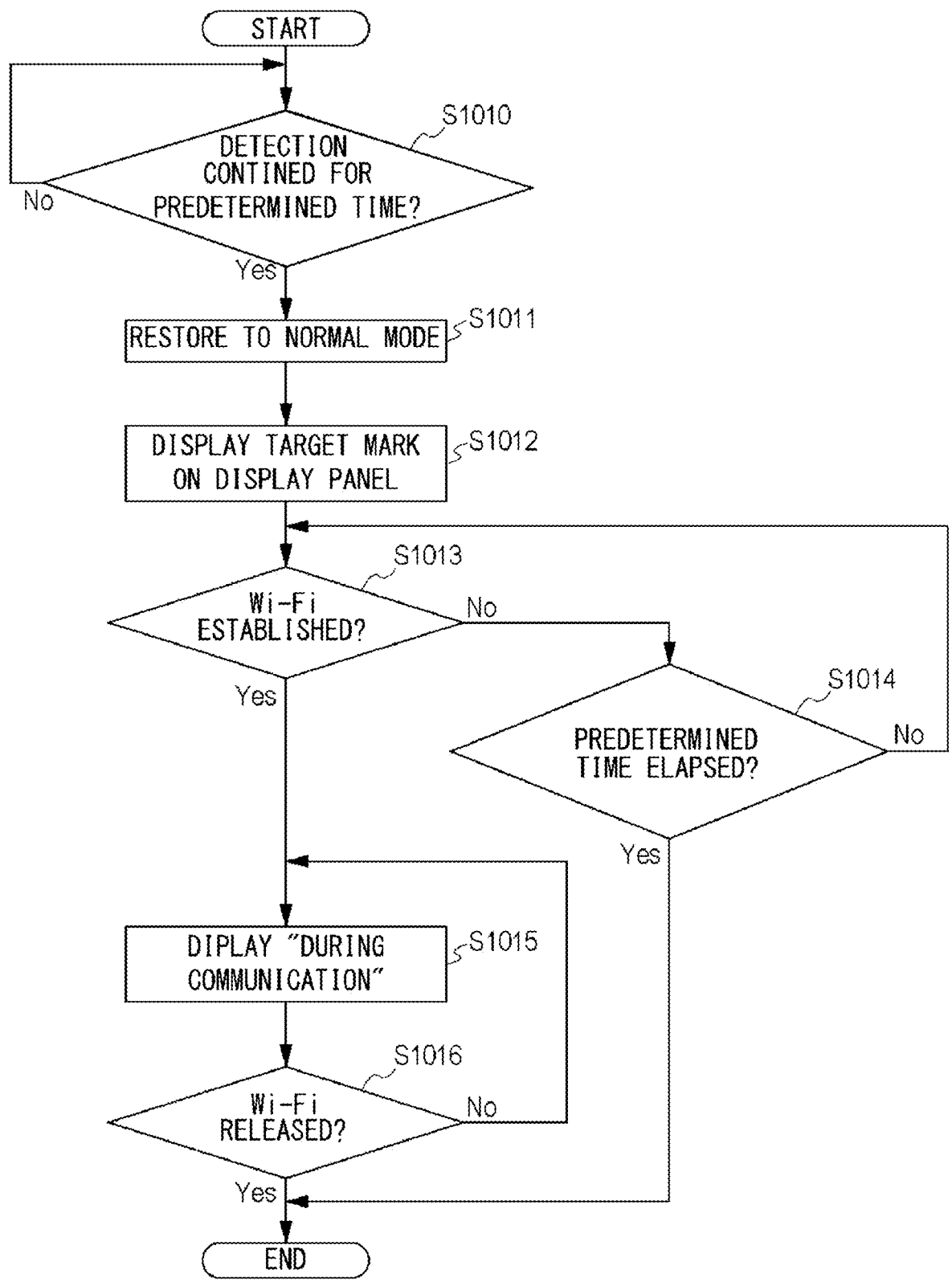

FIG. 12 is a flowchart for illustrating a control flow of Wi-Fi communication from a start of the Wi-Fi communication after a target mark is displayed until an end of the Wi-Fi communication.

Figure 13:
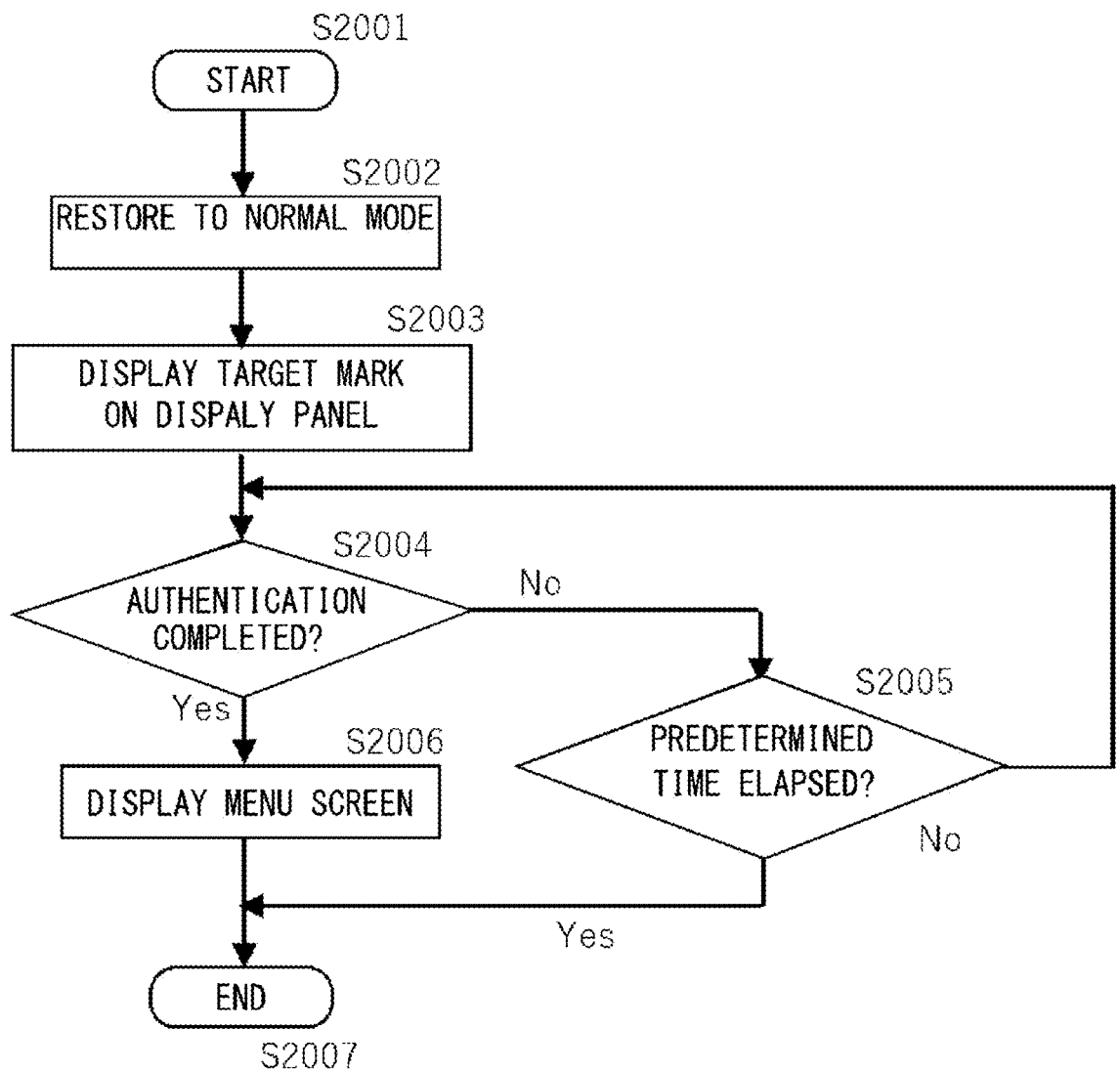

FIG. 13 is a flowchart for illustrating timing when the target mark becomes non-display.

Figure 14:
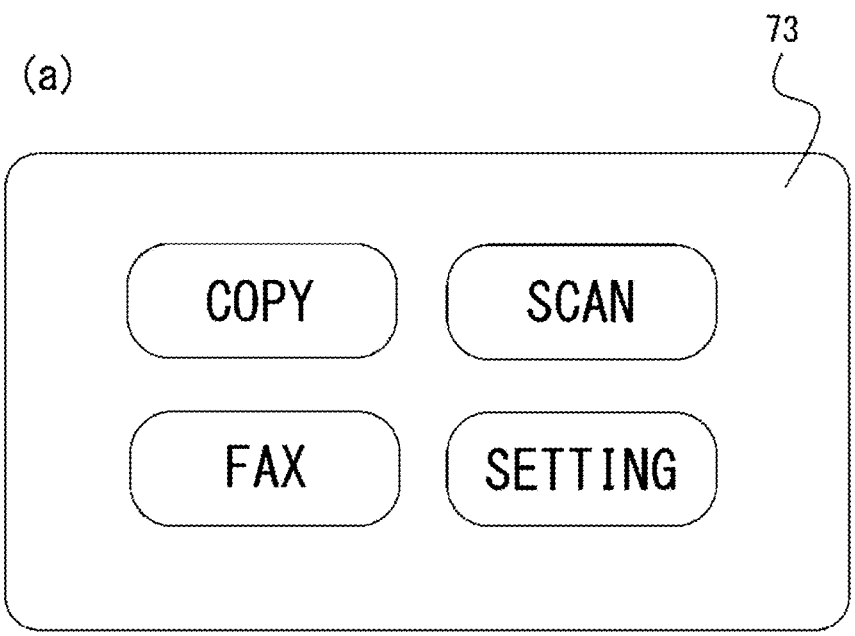
Figure 14:
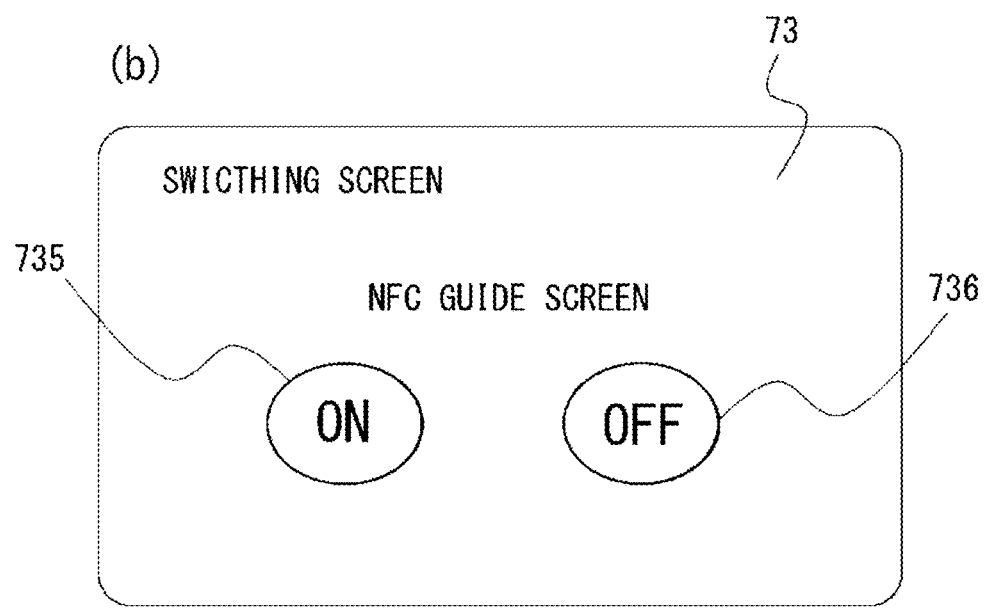

Parts (a) and (b) of FIG. 14 are schematic views for illustrating examples of a main menu screen and a setting screen, respectively.

Figure 15:
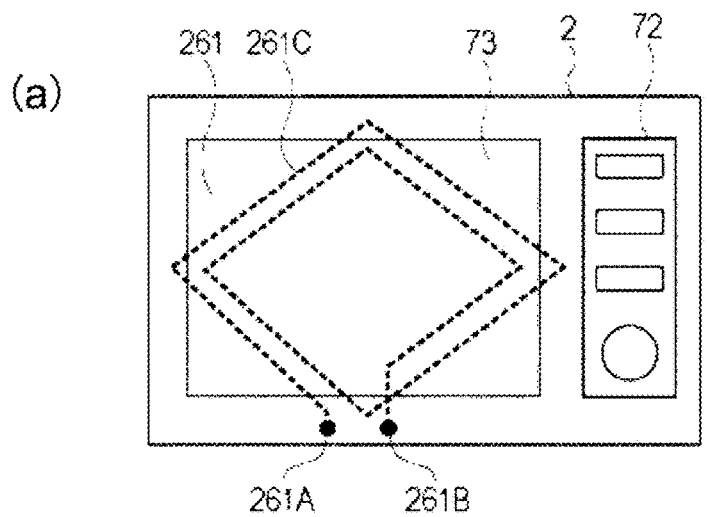
Figure 15:
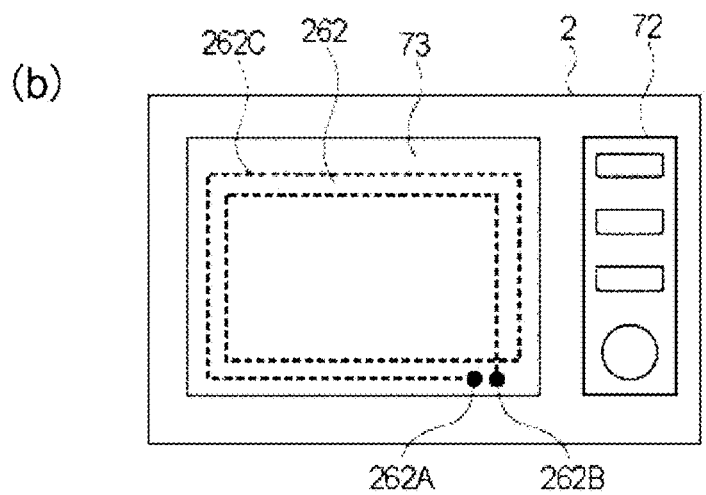
Figure 15:
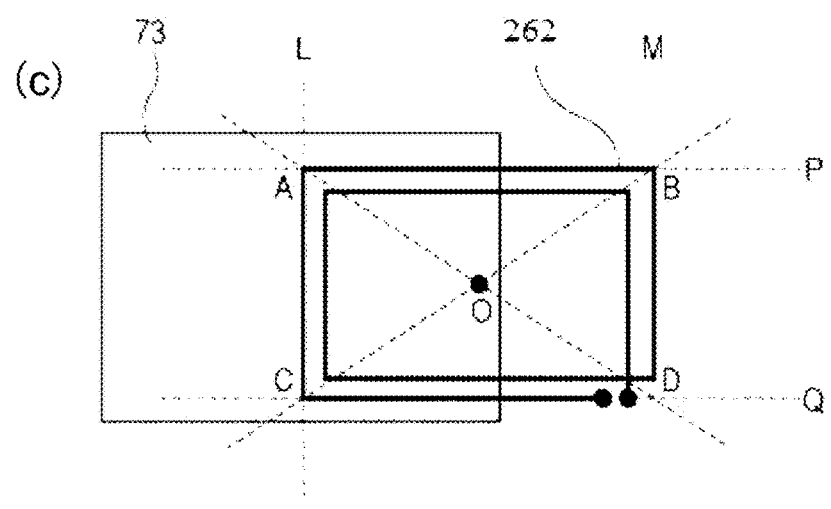

Parts (a) to (c) of FIG. 15 are schematic views for illustrating a positional relationship between the display panel and a loop coil.

Figure 16:
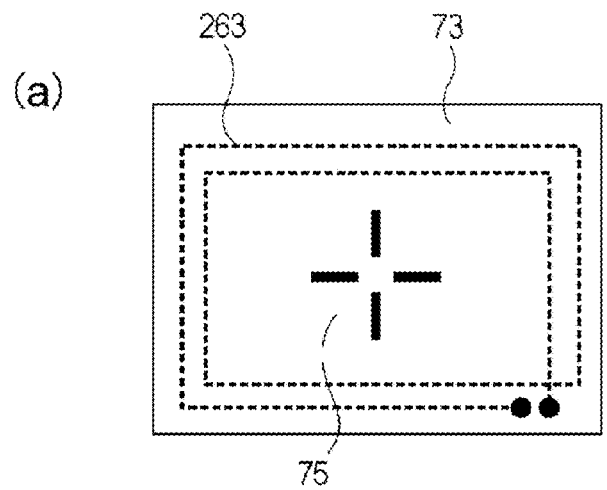
Figure 16:
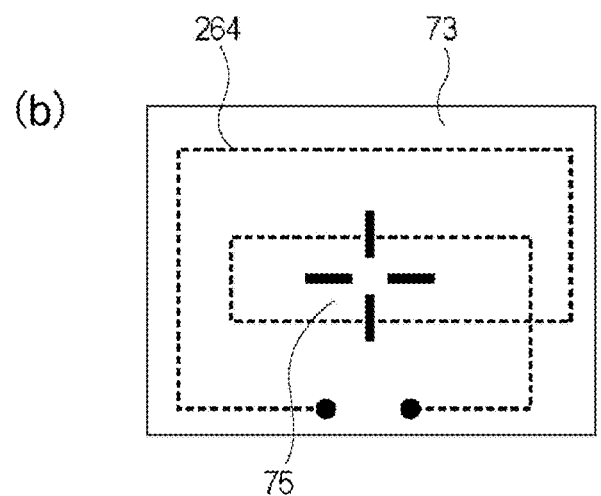
Figure 16:
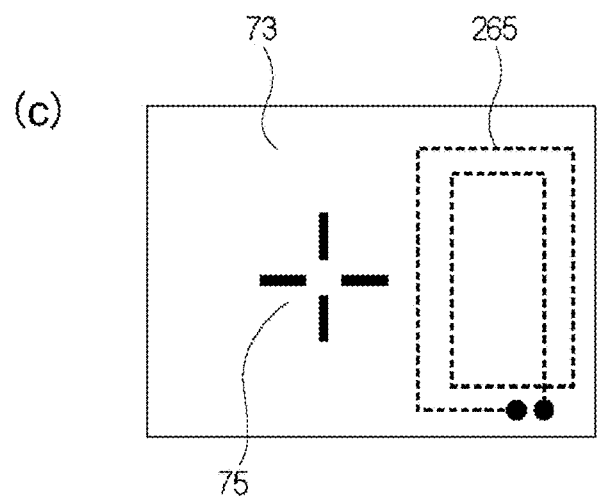

Parts (a) to (c) of FIG. 16 are schematic views for illustrating a positional relationship between the target mark and the loop coil.

Figure 17:
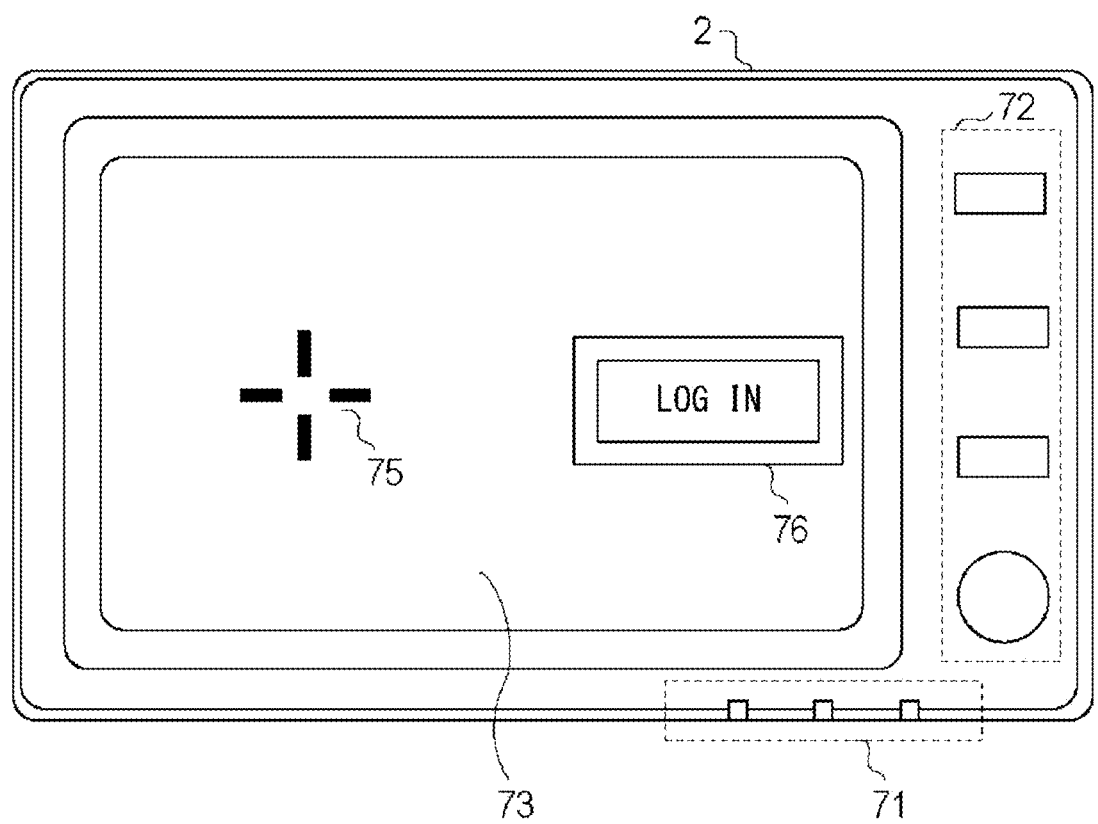

FIG. 17 is a schematic view for illustrating a log-in icon displayed on the display panel.

Figure 18:
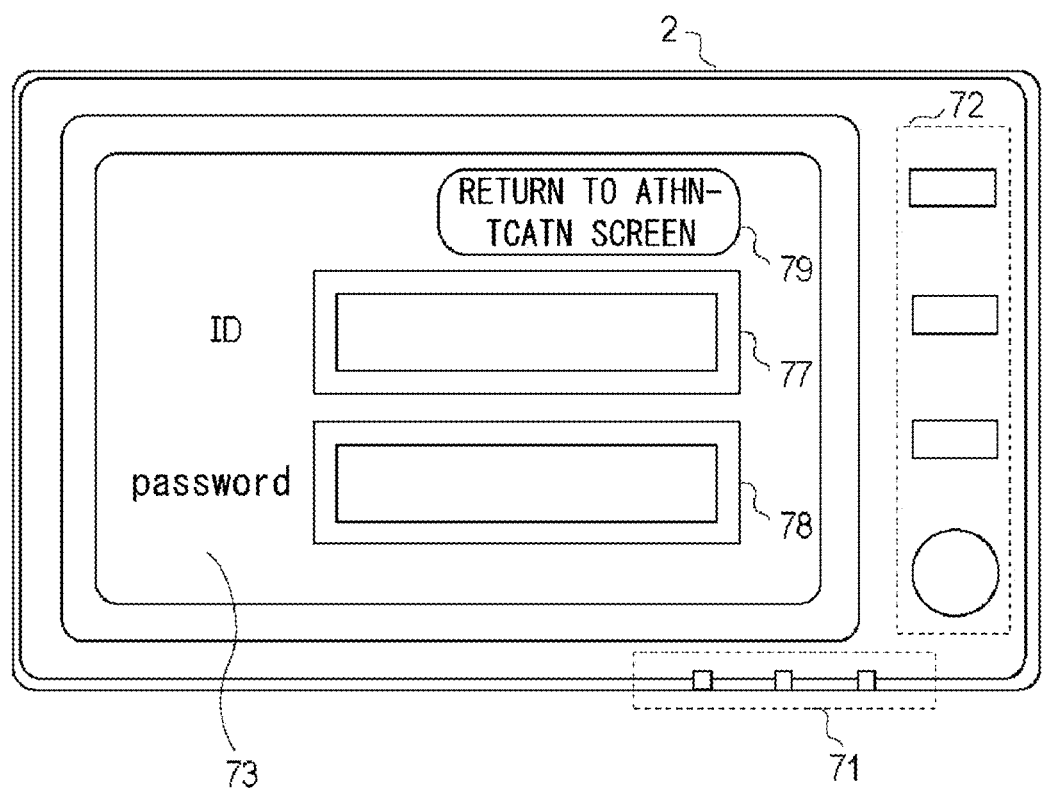

FIG. 18 is a schematic view for illustrating a personal information input screen.

Figure 19:
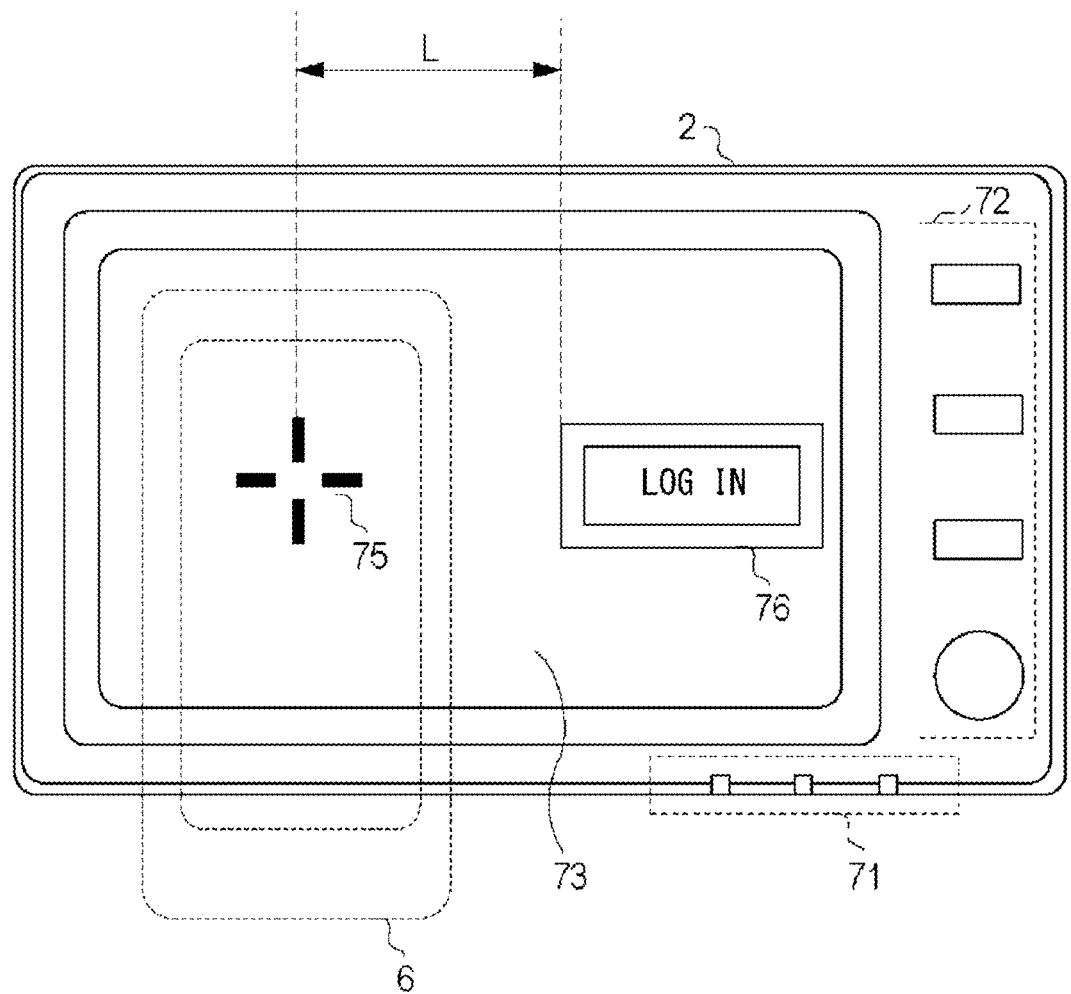

FIG. 19 is a schematic view for illustrating a positional relationship between the target mark and the log-in icon.

DESCRIPTION OF THE EMBODIMENTS

In the following, embodiments for carrying out the present invention will be described with reference to the drawings. In the following description, as regards dimensions, materials, shapes and relative arrangement of constituent elements, the scope of the present invention is not intended to be limited to those described below unless otherwise specified. Further, in the following embodiments, an "operating portion 2" will be described as a portion incorporating a loop coil 26 (261, 262, 263, 264).

Embodiment 1

(Image Forming Apparatus)

Figure 1:
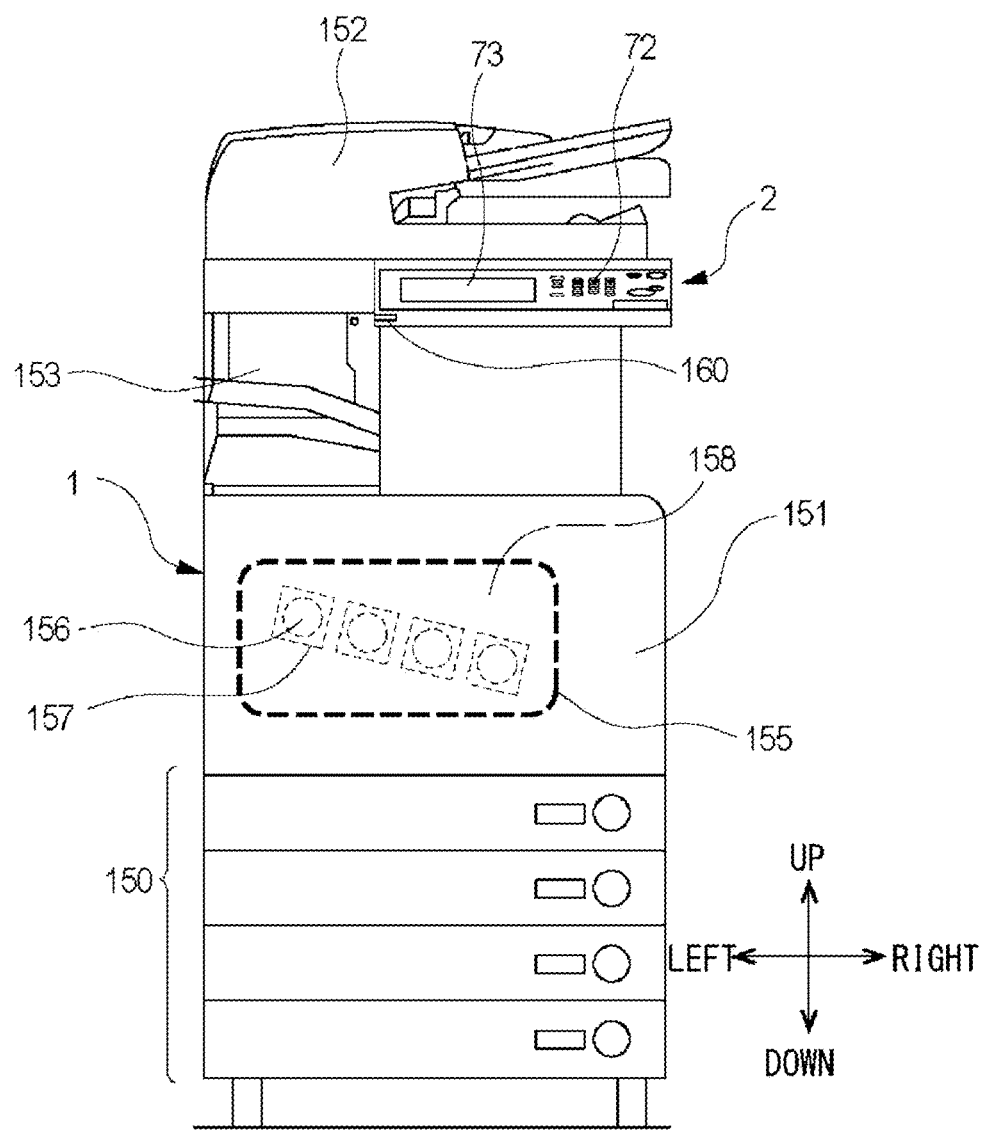
FIG. 1 is a schematic view of an image forming apparatus.

FIG. 1 is a schematic view showing a general structure of an image forming apparatus 1 in an embodiment 1. The image forming apparatus 1 is, for example, a multi-function machine having various functions such as a copying function, a reading function and a printing function. However, the image forming apparatus for carrying out the present invention is not limited to the copying machine, but for example, the image forming apparatus may also be a printer including no image reading apparatus 152.

In FIG. 1, the image forming apparatus 1 includes an image forming until for forming an image on a sheet such as a recording sheet which is an object to be recorded, and includes an image reading apparatus 152, provided above the image forming unit with respect to the vertical direction, for reading an image on a sheet such as an original to be read. The image forming apparatus 1 further includes the operating portion 2 through which an operator such as an operating person or a service person inputs information. The operating portion 2 includes a display panel 73 (described later) and a hardware key portion 72 (described later).

Here, in this embodiment, the operating portion 2 includes a display panel 73 and the hardware key portion 72, but a constitution, which is so-called key-less constitution in which the hardware key portion 72 is not provided may also be employed. In the case of such a constitution, the operating portion 2 includes only the display panel 73. The display panel 73 is a touch panel, and the operator inputs information by an operation such as a touch or a flick. Further, the display panel 73 is capable of displaying information on image formation to the operator. For example, when the operator prints an image on the sheet, information on a size thereof, the number of (printed) sheets and the like is displayed on the display panel 73. Further, on the display panel 73, the display panel 73 also displays a message to the effect that the image forming apparatus is during the image formation. For example, a message such as "During printing" corresponds to this message. These pieces of information relating to an image forming operation will be collectively referred to as "information on image formation".

Although specifically described later, in response to authentication performed the operator by holding a portable terminal 6 over the display panel 73, the display panel 73 displays the information on image formation. For example, it is assumed that the operator selects an image file, to be printed, in the portable terminal 6. In that state, when the operator holds the portable terminal 6 over the display panel 73, a screen for setting the number of printed sheets is displayed on the display panel 73. This screen corresponds to a screen on which the information on image formation is to be displayed. When the operator inputs the number of printed sheets and presses down a start button, the image selected in the portable terminal 6 is printed in the selected (inputted) number of printed sheets.

In the image forming operation of the image forming apparatus 1, first, an image is inputted to the image forming apparatus 1 by the image reading apparatus 152 or an unshown image input means such as a personal computer connected to the image forming apparatus 1. Then, sheets to be recorded are fed one by one from an accommodating portion 150 provided at a lower portion of the image forming apparatus 1, and the inputted image is transferred onto the sheet by an image forming portion 158 and then is outputted to an in-body sheet (paper) discharge space 153. The image forming portion 158 is a generic term of portions, such as a photosensitive drum 156, a developing device, a charger and an intermediary transfer belt, for forming the image.

For the image formation, various output conditions such as the number of outputted sheets and an image size are inputted from the operating portion 2, and on the basis of such information, control of the image forming apparatus 1 is carried out. From the viewpoint of ease of the operation for the operator, the operating portion 2 is provided at an upper portion of the image forming apparatus 1 on a front (surface) side of the image forming apparatus 1 in many instances. Incidentally, a side where the operator stands as seen from the image forming apparatus 1 when the operator faces the image forming apparatus 1 for operating the image forming apparatus 1 is defined as the front side. With respect to the vertical direction, the operating portion 2 is provided above the accommodating portion 150. Between the accommodating portion 150 and the in-body sheet discharge portion 153, a front cover 153 constituting a front-side outer casing of the image forming apparatus 1 is provided. In the case where exchange of a drum cartridge (drum unit) 157 including the photosensitive drum 156 or exchange of a toner cartridge is carried out, the operator performs an exchange operation by opening this front cover 151. The drum cartridge 157 or the toner cartridge is exchanged by being extracted from and inserted into the image forming apparatus 1 from the front side of the image forming apparatus 1. That is, the front cover 153 is rotatable between a closed position where the front cover 153 closes an opening 155 for permitting passing of these cartridges and an open position where the front cover 153 opens the opening 155, and these cartridges are exchanged when the front cover 151 is in the open position. When the front cover 151 is in the open position, the drum cartridge 157 and the toner cartridge is capable of being extracted from and inserted into the image forming apparatus 1 through the opening 155. When the front cover 151 is moved to the open position. A part of the image forming portion 158 is exposed. The operating portion 2 is provided above the front cover 151 with respect to the vertical direction. Here, a side where the operating portion 2 is provided is the front (surface) side of the image forming apparatus 1, and a side opposite from the front (surface) side is referred to as a rear (surface) side of the image forming apparatus 1. Further, as seen from the front side of the image forming apparatus 1, with respect to a widthwise direction perpendicular to a front-rear direction of the image forming apparatus 1, one side is referred to as a right(-hand) side, and the other side is referred to as a left(-hand) side.

Further, as shown in FIG. 1, the image forming apparatus 1 in this embodiment includes a human sensor 160. The human sensor 160 is a sensor for detecting an object existing at a periphery of the image forming apparatus 1. The human sensor 160 is used for detecting a human (the operator such as the operating person or the service person) approaching the image forming apparatus 1. A signal outputted from the human sensor 160 is inputted to a CPU 7 of a controller 3 (FIG. 3) and is processed by the CPU 7. The human sensor 160 includes an arcuate detection area at a front portion of the image forming apparatus 1. The human sensor 160 detects the human in this detection area.

The human sensor 160 is an ultrasonic sensor which outputs a pulse wave of 40 kHz in a non-audible range and which receive reflected wave of the pulse wave reflected by the object (human). Incidentally, the human sensor 160 may also be a sensor other than the ultrasonic sensor if the sensor is capable of detecting the object (including the human). For example, an infrared transmitting/receiving module capable of confirming a change in distance between the sensor and the object every certain time similarly as in the case of the ultrasonic sensor or an infrared light-receiving sensor for receiving infrared radiation radiated from the human may also be used. Or, an electrostatic capacity sensor for measuring a distance between the sensor and the object on the basis of electrostatic capacity between the sensor and the object may also be used. Further, an infrared array sensor in which an infrared receiving portion is arranged in a line or a matrix, or a camera may also be used. Incidentally, these sensors may also be disposed so as to face upward in order to detect the human without being influenced by an obstacle such as a personal computer placed on a desk.

Figure 2:
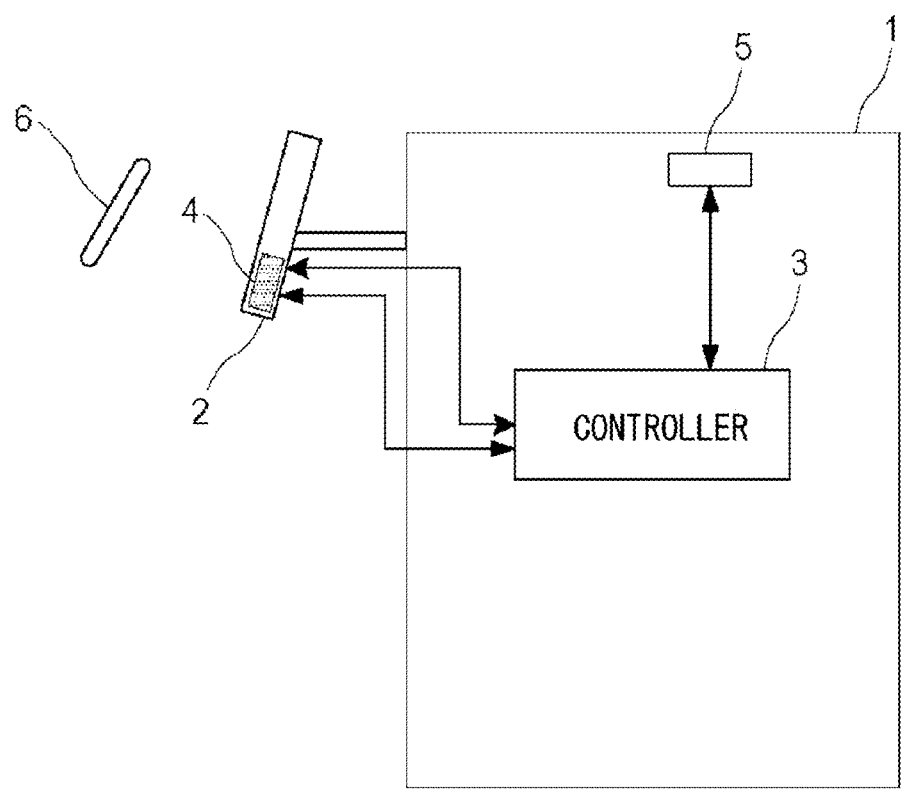
FIG. 2 is a schematic view of the image forming apparatus on a right side.

FIG. 2 is a schematic view of the image forming apparatus 1 as seen from a right side of the image forming apparatus 1. The operating portion 2 is provided on the front side of the image forming apparatus 2. Further, the operating portion 2 is provided so as to be inclined relative to a main assembly of the image forming apparatus 1. For that reason, the operator such as the operating person or the service person is capable of operating the operating portion 2 easily.

The image forming apparatus 1 is capable of performing near field wireless communication with the portable terminal 6. The near field wireless communication is called NFC (near field communication) and conforms to particularly a short-range (distance) wireless (radio) communication standard which is represented by ISO/IEC 18092, ISO/IEC 21481 or the like and in which a communication distance is 10 cm or less, and includes Felica (registered trademark) and Mifare (registered trademark). Further, herein, Bluetooth (registered trademark) is also regarded as one kind of the near field wireless communication. In this embodiment, as an example of the near field wireless communication, the form for performing the NFC will be described.

Further, the image forming apparatus 1 and the portable terminal 6 in this embodiment are also capable of performing normal wireless communication therebetween. The wireless communication referred to herein is wireless communication represented by Wi-Fi communication. Compared with the near field wireless communication such as the NFC, the wireless communication such as the Wi-Fi communication is wide in range of a communicatable area. Further, also regarding capacity of data capable of transmitting and receiving once, compared with the near field wireless communication such as the NFC, the wireless communication such as the Wi-Fi communication is large. In this embodiment, as an example of the normal wireless communication broader in communicatable range and higher in communication speed than the near field wireless communication, the form for performing the Wi-Fi communication will be described.

In order to establish the NFC between the portable terminal 6 and the image forming apparatus 1, the operating portion 2 of the image forming apparatus 1 is provided with an NFC tag portion 4, and a wireless LAN communicating portion 5 is provided inside the main assembly of the image forming apparatus 1. The NFC tag portion 4 and the wireless LAN communicating portion 5 are connected through on interface to the controller 3 for controlling an operation of the image forming apparatus 1. The portable terminal 6 is, for example, a table terminal or a smartphone possessed by the operator. By using the portable terminal 6, it is possible to perform the near field wireless communication and the normal wireless communication with the image forming apparatus 1.

(Hardware Constitution)

Figure 3:
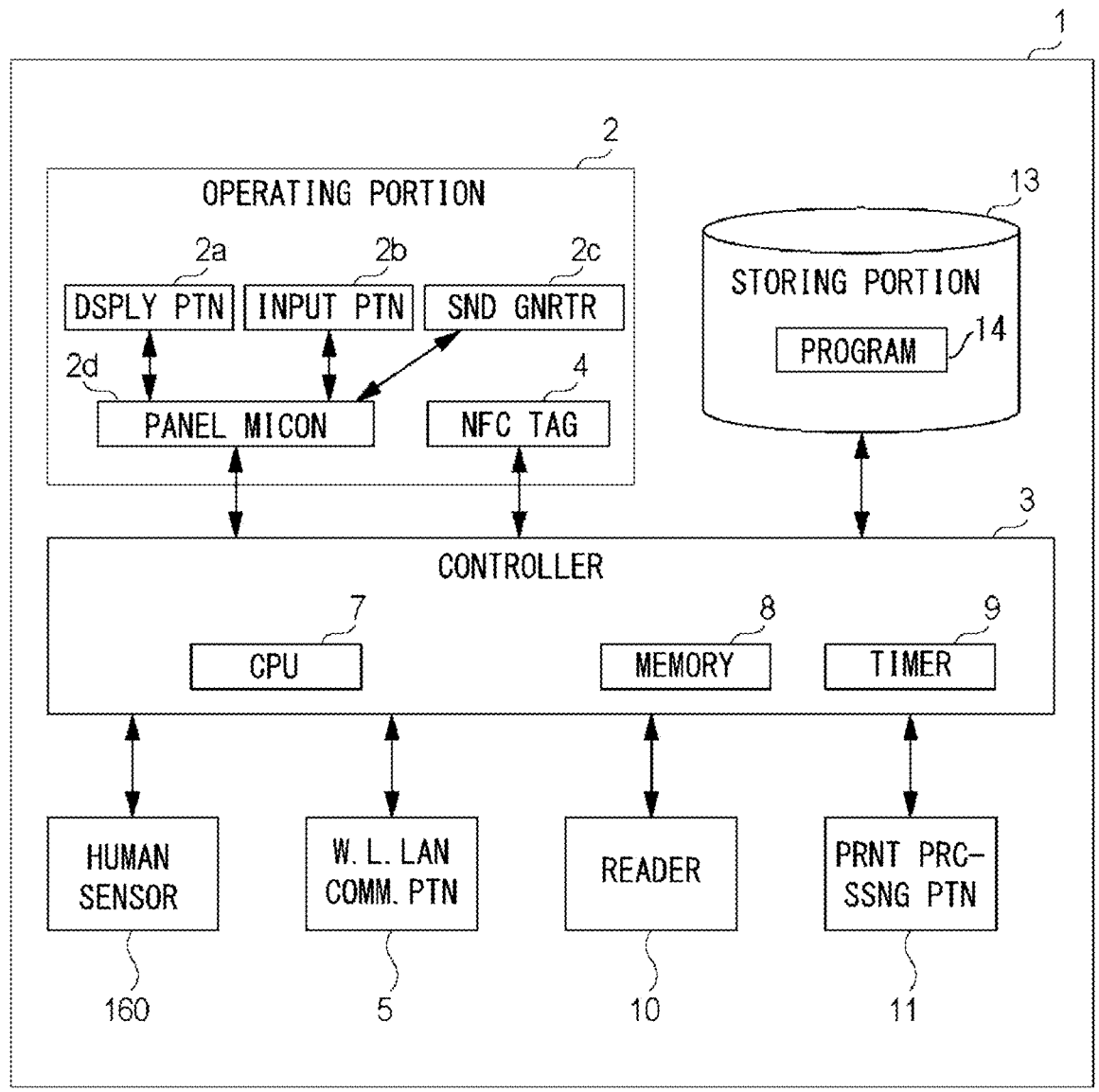
FIG. 3 is a block diagram for illustrating a hardware constitution of the image forming apparatus.

FIG. 3 is a block diagram showing a hardware constitution of the image forming apparatus 1 in this embodiment. As shown in FIG. 3, the image forming apparatus 1 includes the operating portion 2, the controller 3, the wireless LAN communicating portion 5, a reading portion 10, a print processing portion 11 and a storing portion 13.

The operating portion 2 is provided with a constitution for displaying information to the operator and with a constitution for receiving an operation from the operator. The operating portion 2 includes a display portion 2a (an example of the display panel), constituted by, for example, a liquid crystal panel, for displaying various pieces of information. Further, the operating portion 2 includes an operation input portion 2b for detecting an operation through a touch panel or the like provided on the display portion 2a and for permitting input of an operation instruction from a detection result thereof by the operator. Further, the operating portion 2 includes an operating panel microcomputer 2d for controlling the display portion 2a and the operation input portion 2b and for communicating with the controller 3. Further, the operating portion 2 includes an operation sound generating portion 2c for generating various operation sounds with the operation.

The display portion 2a is capable of displaying an image on the liquid crystal panel by receiving image data from the controller 3 through a transfer line (not shown) for the image data. The NFC tag portion 4 performs the NFC on the basis of the NFC standard with an external device. By the NFC, input and output of the data are performed between the external device and the controller 3. The NFC tag portion 4 is constituted by an IC for RFID (radio frequency identification) and operates as an NFC tag.

The controller 3 includes a CPV 7, a memory 8 and a timer 9, and controls operations of respective portions. The CPU 7 reads and executes a program 14 stored in a storing device 13. The program 14 is a program for causing the controller 3 to execute various processes. The memory 8 stores temporary data with the execution of the various processes by the CPU 7. The timer 9 is used for performing timing when the controller 3 executes the various processes.

The wireless LAN communicating portion 5 performs a wireless LAN communication process with the external device and performs data input and output carried out between the external device and the controller 3. The wireless LAN communicating portion 5 in this embodiment performs processing of the wireless LAN communication on the basis of the wireless LAN standard. Specifically, in accordance with the wireless LAN standard, the wireless LAN communicating portion 5 performs sending (transmitting) and receiving processes of data packet.

Incidentally, the wireless LAN communicating portion 5 corresponds to a wireless LAN direct mode, and the wireless LAN communicating portion 5 operates as a wireless LAN access point (software access point). By this, it is possible to perform the wireless LAN communication with the external device without through an external wireless LAN access point.

The reading portion 10 is a processing portion for reading an original image and for generating image data. For example, the reading portion 10 includes an original feeding portion for feeding plurality of originals, stacked on an original stacking table, one by one from a topmost original, and includes an image data output portion for converting the read original image into image data and for outputting the image data.

The print processing portion 11 is a processing portion for outputting a print by executing a printing process on the basis of the image data. For example, the print processing portion 11 includes the image forming portion 158 for forming an image on the basis of the image data, a transfer portion for transferring a toner image (image), formed by the image forming portion 158, onto a sheet, and a fixing portion for fixing the transferred toner image on the sheet. Further, the print processing portion 11 also includes a print conveying portion for discharging the print on which the toner image is printed, and the like portion.

The storing portion 13 is a storing device for storing various pieces of information. The storing portion 13 stores the above-described program 14.

Although specifically described later, when the human sensor 160 detects the human, the human sensor 160 sends a signal to the CPU 7 so as to cause the image forming apparatus 1 to restore from a power saving mode to a normal mode.

Figure 4:
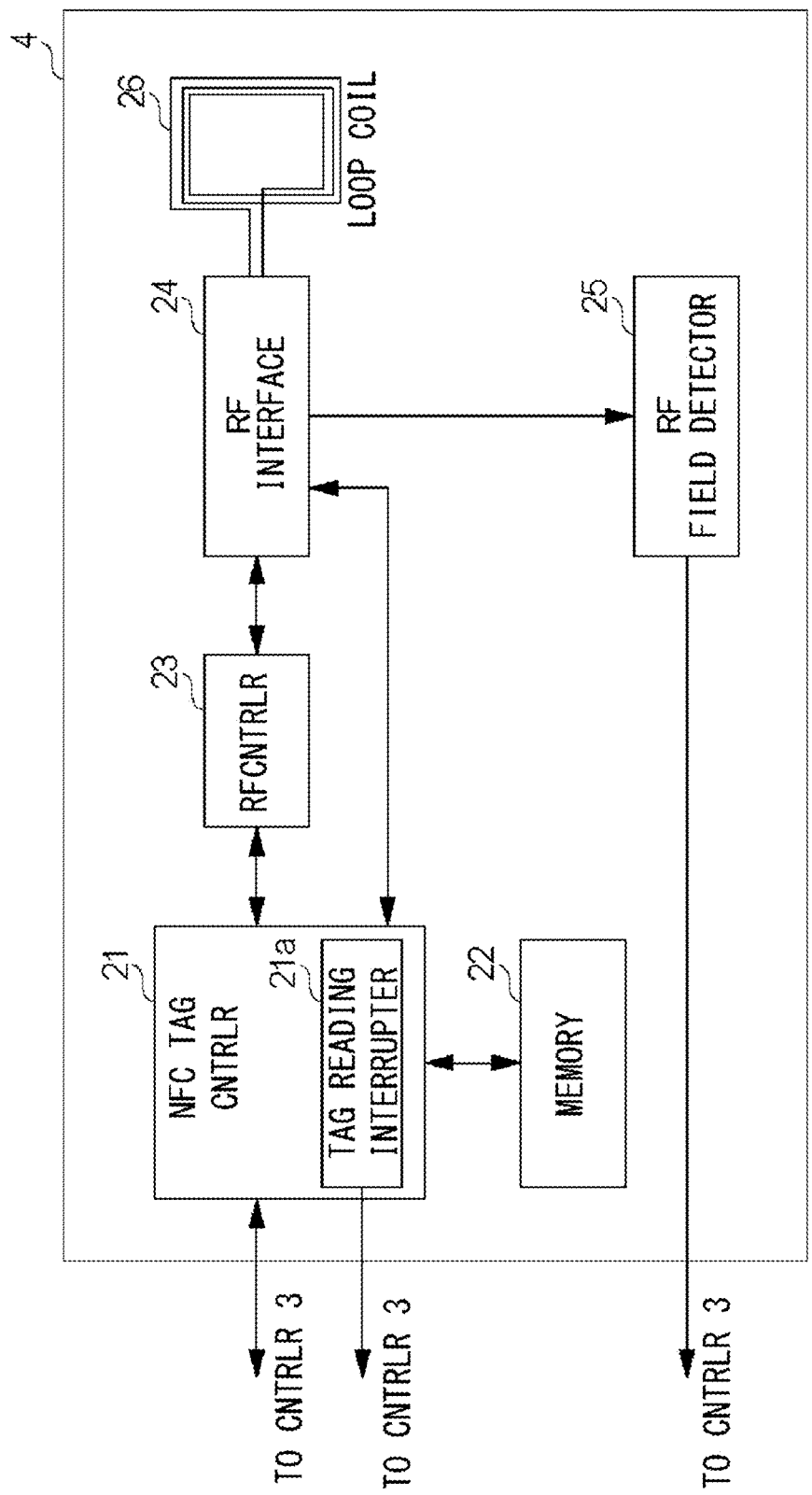
FIG. 4 is a block diagram for illustrating a hardware constitution of an NFC tag portion.

FIG. 4 is a block diagram specifically showing an example of a hardware constitution of the NFC tag portion 4. An NFC tag controller 21 carries out control of respective portions of the NFC tag portion 14 and performs data input and output relative to the controller 3 through an interface.

A tag reading interrupting generating portion 21a is constituted inside the NFC tag controller 21, and by the NFC communication with the external device, the tag reading interruption generating portion 21a generates an interruption signal when reading of tag data from NFC tag data and writing of the tag data into the NFC tag data are performed. The tag reading interruption generating portion 21a includes an interruption signal output connected to the controller 3.

The memory 22 stores data written as the NFC tag data from the controller 3 or the portable terminal 6 and is constituted by a non-volatile memory. Further, the data written in the memory 22 is capable of being read by the controller 3.

An RF controller 23 performs modulation and demodulation processes of electromagnetic radiation for RF communication when the NFC with the external device is established.

An RF interface portion 24 performs electromagnetic coupling by being subjected to electromagnetic radiation when the NFC with the external device is performed, and performs receiving and sending processes of the electromagnetic radiation (electromagnetic wave).

An RF field detecting portion 25 detects an electromagnetic field (RF field) in a period in which the RF interface portion 24 is subjected to the electromagnetic radiation in the NFC with the external device. Specifically, the RF field detecting portion 25 detects electric power (energy) of the electromagnetic radiation. A detection output of the RF field detecting portion 25 is connected to the controller 3.

A loop coil 26 is a coil for establishing the NFC. In this embodiment, the loop coil 26 is formed in a loop shape for performing electromagnetic coupling by being subjected to the electromagnetic radiation from the external device and then for establishing the communication by the electromagnetic radiation. Although specifically described later, the loop coil 26 is electrically connected to an unshown substrate, and the loop coil 26 referred to herein is a loop-shaped coil portion (an example of an antenna) excluding the substrate. In this embodiment, the NFC tag portion 4 performs the electromagnetic coupling by being subjected to the electromagnetic radiation from the external device and operates by receiving electric power supplied due to electromotive force generated by this electromagnetic coupling.

Figure 5:
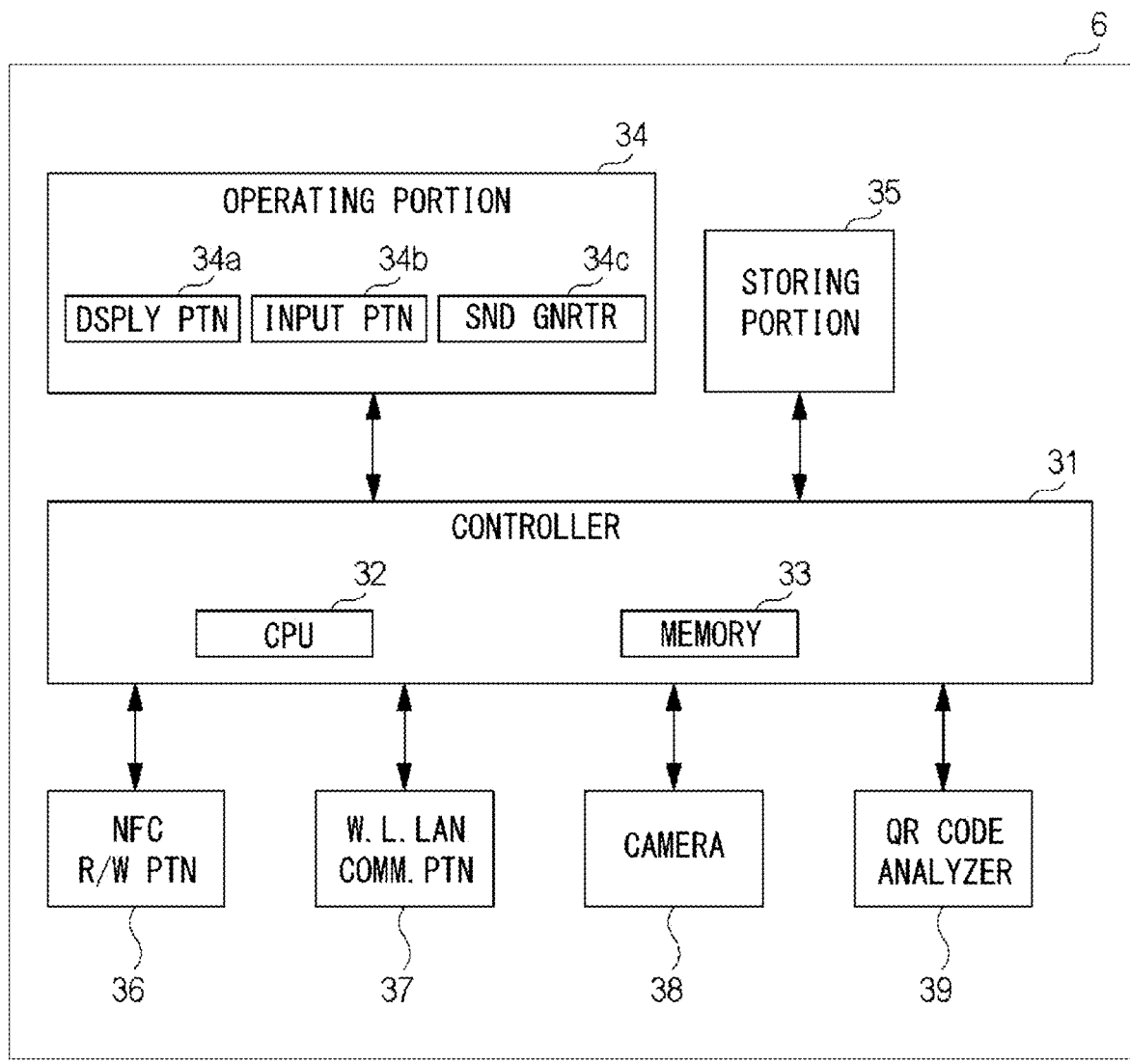
FIG. 5 is a block diagram for illustrating a hardware constitution of a portable terminal.

FIG. 5 is a block diagram showing an example of a hardware constitution of the portable terminal 6. A controller 31 controls the portable terminal 6 and is constituted by a CPU 32 and a memory 33. The CPU 32 reads and executes various programs stored in a storing device (portion) 35. The memory 33 stores temporary data and the like with execution of the programs by the CPU 32.

An operating portion 34 is provided with a constitution for displaying information to the operator and with a constitution for receiving an operation from the operator. The operating portion 34 is constituted by, for example, a liquid crystal panel and includes a display portion 34a (an example of a display panel) for displaying various pieces of information. Further, the operating portion 34 detects an operation to a touch panel or the like provided on the display portion 34a and includes an operation input portion 34b for inputting an operation instruction by the contact from a detection result thereof. Further, the operating portion 34 includes an operating panel microcomputer 34d for communicating with the controller 31 by controlling the display portion 34a or the operation input portion 34b. Further, the operating portion 34 includes an operation sound generating portion 34c for generating various operation sounds with operations.

An NFR_R/W portion 36 performs the NFC on the basis of the NFC standard, and thus performs data input and output carried out between the external device and the controller 3.

A wireless LAN communicating portion 37 performs communication processing with the external device on the basis of the wireless LAN standard, and thus performs data input and output carried out between the external device and the controller 31. In this embodiment, the wireless LAN communicating portion 37 performs processing of the wireless LAN communication on the basis of the wireless LAN standard. Specifically, in accordance with a wireless LAN communication procedure, the wireless LAN communicating portion 37 carries out sending and receiving processes of data packet.

A camera 38 is a camera for image pick-up. A QR code (registered trademark) analyzing portion 39 analyzes a read QR code and acquires a QR code data.

Further, although not illustrated in FIG. 5, the portable terminal 6 is provided with a voltage (power) supply constitution necessary for a portable terminal device, such as a battery or a voltage controller.

Figure 6:
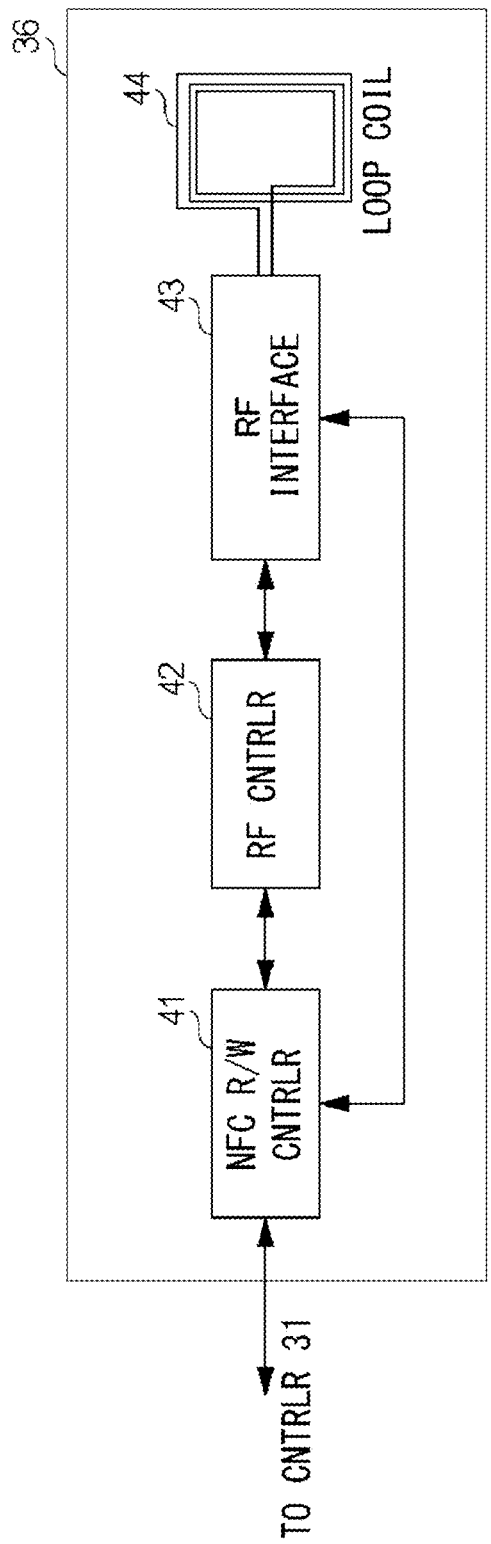
FIG. 6 is a block diagram for illustrating a hardware constitution of an NFC_R/W portion.

FIG. 6 is a block diagram specifically showing an example of a hardware constitution of the NFC_R/W portion 36. An NFR_R/W controller 41 carries out data input and output relative to the controller 31 through an interface.

An RF controller 42 performs modulation and demodulation of the electromagnetic radiation for RF communication when the NFC with the external device is carried out.

An RF interface portion 43 performed electromagnetic coupling by electromagnetic radiation (or by being subjected to electromagnetic radiation) when the NFC with the external device is carried out, and thus performs receiving and sending processes of the electromagnetic radiation.

A loop coil 44 is a coil for establishing the NFC with the external device. In this embodiment, the electromagnetic coupling is performed by subjecting the external device to the electromagnetic radiation, so that a loop is formed through one full circumference or more in order to perform communication by the electromagnetic radiation.

(NFC and Wi-Fi Communication Between Image Forming Apparatus and Portable Terminal)

Figure 7:
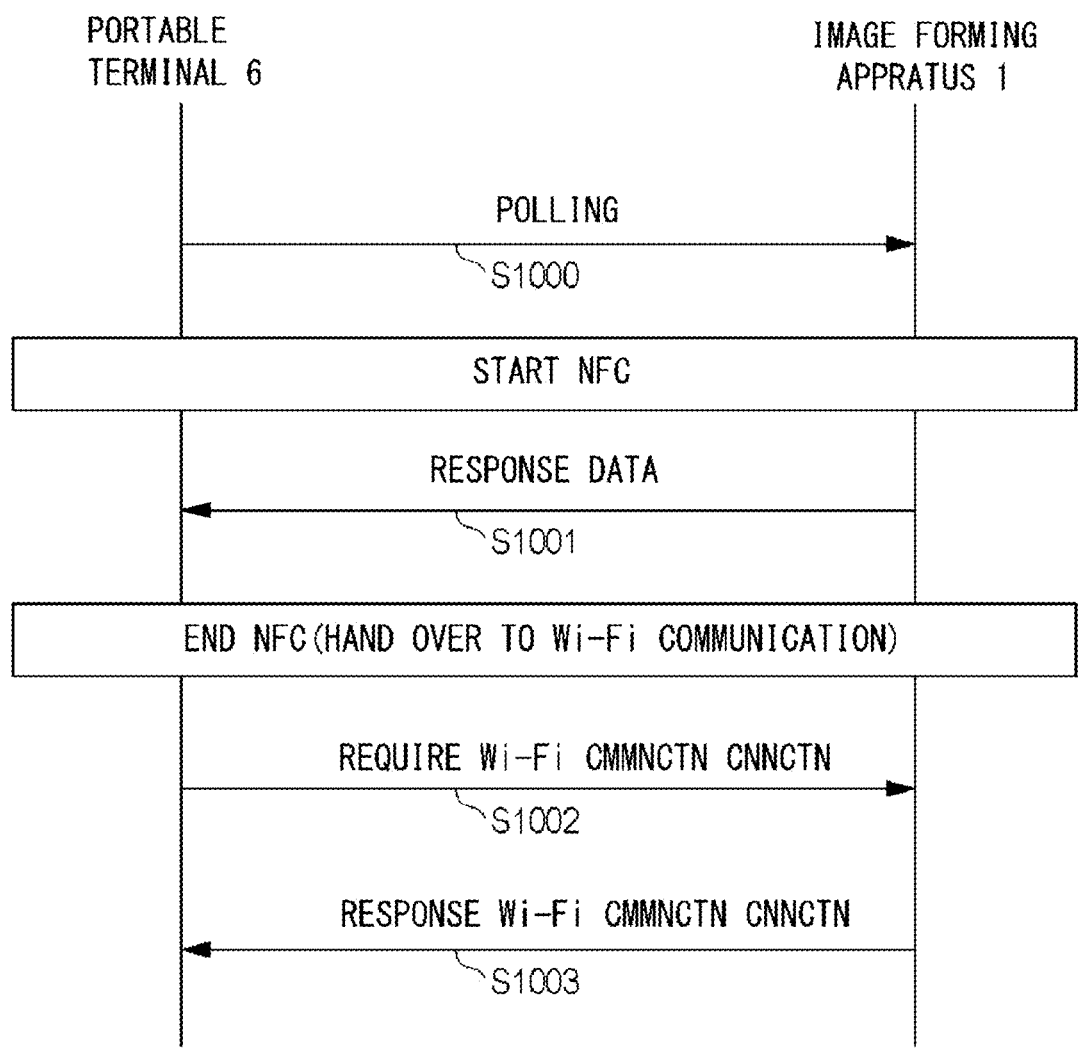
FIG. 7 is a schematic view for illustrating a mechanism when the image forming apparatus establishes NFC and Wi-Fi communication with the portable terminal.

FIG. 7 is a schematic view for illustrating a mechanism in which the image forming apparatus 1 in this embodiment establishes the wireless communication (Wi-Fi communication), such as the NFC and the Wi-Fi, with the portable terminal 6. The NFC_R/W portion 36 of the portable terminal 6 performs electromagnetic coupling with the NFC tag portion 4 of the image forming apparatus 1 and reads the NFC tag data of the NFC tag portion 4 by the NFC. The NFC tag data includes an SSID, an encryption key and an IP address which are necessary to perform the Wi-Fi communication. That is, the operator is capable of acquiring the SSID, the encryption key and the IP address for establishing the Wi-Fi communication with the image forming apparatus 1 by performing an operator of holding the portable terminal 6 over the image forming apparatus 1, and thus is capable of starting the Wi-Fi communication between the portable terminal 6 and the image forming apparatus 1.

The image forming apparatus 1 performs authentication of the portable terminal 6 (i.e., authentication of the operator operating the portable terminal 6) toner the NFC and performs data transfer through the Wi-Fi communication.

First, an operation, indicated by S1000 in FIG. 7, performed from the portable terminal 6 to the image forming apparatus 1 will be described. The NFC_R/W portion 36 performs a polling operation for reading the NFC tag data of the NFC tag portion 4. The polling is one of control types in which a plurality of devices and a plurality of pieces of software are smoothly associated with each other. By performing the polling operation, it is possible to prevent an occurrence of an inconvenience due to contention of a certain system (the portable terminal 6 in this embodiment), with another system, which is intended to establish communication with a main system (the image forming apparatus 1 in this embodiment).

In response to the polling performed from the portable terminal 6, the image forming apparatus 1 actuates the NFC tag portion 4. The NFC_R/W controller 41 of the NFC_R/W portion 36 of the portable terminal 6 controls the RF controller 42, and thus modifies the electromagnetic radiation on the basis of the NFC standard. This modified wave (radiation) is transmitted to the RF interface portion 43. Further, the transmitted modified wave is radiated as the electromagnetic radiation from the RF interface portion 43 through the loop coil 44. By this (radiated) electromagnetic radiation, an RF field is formed in the neighborhood of the NFC_R/W portion 36 and the NFC tag portion 4, so that the NFC_R/W portion 36 and the NFC tag portion 4 are electromagnetically coupled to each other. That is, the NFC is started.

Next, an operation, indicated by S1001 in FIG. 7, performed from the image forming apparatus 1 to the portable terminal 6 after the NFC is started will be described.

The loop coil 26 receives the electromagnetic radiation radiated from the loop coil 44 in S1000. The received electromagnetic radiation is transmitted to the RF interface portion 24, and the RF interface portion 24 generates the electromotive force due to the electromagnetic coupling. By this electromotive force, the NFC tag portion 4 is supplied with electric power and thus operates. Simultaneously, the electromagnetic radiation received by the RF interface portion 24 is transmitted to the RF controller 23.

The NFC tag controller 21 controls the RF controller 23, and acquires demodulation data by demodulating the electromagnetic radiation transmitted to and modulated by the RF controller 23. The NFC tag controller 21 acquires the demodulation data and detects that reading requirement of the NFC tag data is made from the portable terminal 6. By this, the NFC tag controller 21 reads the data (the SSID, the encryption key and the IP address) written as the NFC tag data in the memory 22, and then transfers the data as response data to the RF controller 23.

The NFC tag controller 21 modulates the response data by controlling the RF controller 23. The NFC tag controller 21 modulates the response data on the basis of the NFC standard by controlling the RF controller 23. The modulated data is radiated as the electromagnetic radiation through the RF interface portion 24 and the loop coil 26. In response to an end of sending of the response data, the NFC tag controller 21 generates an interrupting signal by the tag reading interruption generating portion 21a.

Then, the loop coil 44 of the portable terminal 6 receives the electromagnetic radiation with the response data radiated from the loop coil 26 of the image forming apparatus 1. The received electromagnetic radiation is transmitted to the RF controller 42 through the RF interface portion 43. The NFC_R/W controller 41 controls the RF controller 42 and thus demodulates the electromagnetic radiation transmitted to the RF controller 42, so that the NFC_R/W controller 41 acquires the demodulation data.

Thereafter, the NFC_R/W controller 41 notifies the controller 31 of completion of reading of the NFC tag data of the NFC tag portion 4. At the same time, the NFC_R/W controller 41 transfers the read NFC tag data to the controller 31.

When the portable terminal 6 receives notification, from the NFC_R/W controller 41 of the NFC_R/W portion 36, to the effect that the reading of the NFC tag data is completed, the controller 31 causes the operation sound generating portion 34c of the operation panel 34 to generate an operation completion sound.

By this, the operator is capable of knowing completion of the reading of the NFC tag data of the NFC tag portion 4 in the image forming apparatus, by the NFC_R/W portion 36 of the portable terminal (device) 6.

On the other hand, the case where the NFC tag portion 4 of the image forming apparatus 1 acquires the data of the NFC tag portion 36 of the portable terminal 6 is similar to the above-described case except that a relationship between a data output side and a data reading side is reversed.

Next, by using the NFC tag data (the SSID, the encryption key and the IP address) acquired by the portable terminal 6 through the NFC, a step S1002 in which a connection requirement of the Wi-Fi communication is outputted from the portable terminal 6 to the image forming apparatus 1 will be described.

In general, in the wireless communication such as the Wi-Fi, a network is formed by connecting a Wi-Fi ready terminal to the access point performing a function of a relay point. In an example of this embodiment, the access point corresponds to the image forming apparatus 1, and the Wi-Fi ready terminal corresponds to the portable terminal 6. Here, for example, in the case where a plurality of image forming apparatuses each performing the function of the access point exist, the portable terminal 6 has to select that the portable terminal 6 should be connected to which access point. The operator is required to discriminate that the portable terminal 6 should be connected to which access point, and a means function as a discrimination indicator at that time is the SSID. In the case where the operator performs wireless communication of the portable terminal 6 to the image forming apparatus 1 without using the NFC, there is a need to select the SSID corresponding to the image forming apparatus 1 from a plurality of SSIDs and then to connect the portable terminal 6 to the image forming apparatus 1. By automatically acquiring the SSID through the NFC, it is possible to save time and effort such that the operator manually selects the SSID corresponding to the image forming apparatus 1. The SSID is included in the NFC tag data.

In the case where the image forming apparatus can be discriminated (identified) by the SSID, establishment of the Wi-Fi communication is performed, but the encryption key is needed at that time. The encryption key is required to encrypt communication contents. When the operator selected the SSID manually, the operator also inputs the encryption key manually. The NFC tag data includes the SSID, and therefore, in response to a touch of the portable terminal 6 to the NFC tag portion 4 by the operator, in addition to the SSID, the encryption key is also sent to the portable terminal 6.

Further, the NFC tag data also includes information on the IP address of the image forming apparatus 1. For that reason, the portable terminal 6 acquired the NFC tag data is capable of knowing the address of the image forming apparatus on the network.

Thus, authentication of the portable terminal 6 by the image forming apparatus 1 is ended. The portable terminal 6 and the image forming apparatus 1 prepares for wireless communication connection (connection through Wi-Fi communication) for transferring data, by the authentication of the portable terminal 6 performed by the image forming apparatus 1.

First, the portable terminal 6 acquired the NFC tag data sends, to the image forming apparatus 1, "connection requirement" for establishing the Wi-Fi communication with the image forming apparatus 1 by using this data. Then, the image forming apparatus received the "connection requirement" sends, to the portable terminal 6, a message to the effect that the image forming apparatus 1 received the requirement, as "connection response", so that a state of the Wi-Fi communication is established.

As described above, in response to the touch of the portable terminal 6 to the NFC tag portion 4 by the operator, the NFC is started. The operation performed by the operator is only the touch of the portable terminal 6 to the NFC tag portion 4, and all the selection of the SSID and the input of the encryption key are automatically performed. For that reason, for the operator, the W-Fi communication is started in response to the touch of the portable terminal 6 to the NFC tag portion 4, and therefore the operator can actually feel good usability.

Parts (a) to (d) of FIG. 7 are schematic views each showing a screen of the portable terminal 6 in a state in which a dedicated application is launched. Part (a) of FIG. 8 shows the screen displayed on the portable terminal 6 when the dedicated application is launched. At this time, the portable terminal 6 radiates the electromagnetic radiation for carrying out polling. In this embodiment, an item of "CANCEL" is provided. When the operator touches this item, the portable terminal 6 stops the electromagnetic radiation for carrying out the polling, and the application ends. Further, also in the case where a predetermined time has elapsed from display of the screen of "SEEK MULTI-FUNCTION MACHINE" (in progress) shown in part (a) of FIG. 8, the application ends automatically.

Part (b) of FIG. 8 is the screen displayed temporarily in response to establishment of the Wi-Fi communication between the portable terminal 6 and the image forming apparatus 1. By display of this screen, the operator is capable of confirming the establishment of the Wi-Fi communication between the portable terminal 6 and the image forming apparatus 1.

After the screen of part (b) of FIG. 8 is temporarily displayed, the screen transfers to the screen of part (c) of FIG. 8. The screen of part (c) of FIG. 8 is a job selection screen for selecting a job to be executed. In this embodiment, in this job selection screen, three items "CAPTURE", "PRINT" and "END APPLICATION" are displayed. Incidentally, the number of the items displayed in this screen is not limited to the three items. A specification is such that a job other than jobs of the "CAPTURE" and the "PRINT" can be selected may be used, and a specification such that another job can be selected in addition to these jobs may also be used.

Here, functions of the two jobs of the "CAPTURE" and the "PRINT" capable of being executed by using the application in this embodiment will be briefly described.

The "CAPTURE" is a function of capturing data of an original read (scanned) by the image forming apparatus 1, as an image, into the portable terminal 6. When the original is read by the image forming apparatus 1, for example, the image reading apparatus 152 can be used. In the case where the screen of part (b) of FIG. 8 is displayed and the Wi-Fi communication between the portable terminal 6 and the image forming apparatus 1 is established, the operator sets the original, intended to be captured in the portable terminal 6, in the image reading apparatus 152. Thereafter, when the operator touches the item of the "CAPTURE" on the screen of part (c) of FIG. 8, the reading of the original into the image reading apparatus 152 is started.

When the reading of the original is ended, the image forming apparatus 1 sends, to the portable terminal 6, image data of the read original through the Wi-Fi communication. Thus, the capture of the original into the portable terminal 6 is completed.

Further, the "PRINT" is a function of printing an image and a document file which are stored in the portable terminal 6 or a WEB page during browsing, by the image forming apparatus 1. In the screen of part (c) of FIG. 8, when the operator touches the item of the "PRINT", the screen transfers to the screen of part (d) of FIG. 8. The screen of part (d) of FIG. 8 is an example showing a list screen of files capable of being printed by using the image forming apparatus 1. In this screen, the operator selects the file which is intended to be printed by the operator. When the file is selected, image data relating to the file is sent to the image forming apparatus 1. The image forming apparatus 1 forms an image on the basis of the image data sent from the portable terminal 6 and prints the image on a sheet. Thus, the operator is capable of printing the image and the document filed which are stored in the portable terminal 7 and the WEB page during blowing. Compared with the near field wireless communication such as the NFC, in the wireless communication such as the Wi-Fi communication, a capacity of data communicatable per unit time is large, and therefore, even data including an image such as a photography or a document file is capable of being transferred smoothly.

Here, the form of the application is not limited to the form in this embodiment. For example, at first, the screen shown in part (c) of FIG. 8 is displayed, and the operation to be executed may also be selected. In this case, for example, when the operator selects the "PRINT", the operator selects the image file to be printed (part (d) of FIG. 8) and then holds the portable terminal over the display panel 73. Then, authentication is performed in response to the holding of the portable terminal 6 over the display panel 73, and thereafter the Wi-Fi communication is started, so that a desired image is printed. The operator first selects an image desired to be printed and then holds the portable terminal 6 over the display panel 73, so that the associated image is printed from the image forming apparatus 1, and therefore, the operator is capable of printing the image by a simple operation.

FIG. 9 is an example of a screen displayed on the display panel 73 when the authentication by the NFC is performed and the Wi-Fi communication is enabled. A condition such as the number of printed sheet, a sheet size or the like may be selected by the application provided on the portable terminal 6 side described with reference to FIG. 8, but as shown in an example of FIG. 10, such a condition may also be selected by using the display panel 73 as in an example shown in FIG. 10. This screen is also an example of a "screen displaying information relating to image formation". This screen is displayed in response to the authentication of the portable terminal 6 performed through the NFC.

Specifically, first, the operator selects the image file, the document file or the like which is intended to be printed, in the portable terminal 6 (part (d) of FIG. 8). Thereafter, the operator sets various print settings on the display panel 73 on which as information relating to the image formation, "color information 73*a*", "printed sheet number information 73*b*", "print side information 73*c*" and "sheet size information 73*d*" are displayed. After the settings are completed, when the operator presses shown a start button, a desired image is printed.

(Structure of Operating Portion)

FIG. 10 is a schematic view for illustrating a structure of the operating portion 2 of the image forming apparatus 1. An operating portion 200 shown in FIG. 10 is of a so-called key-less type. The operating portion 2 described with reference to FIG. 1 is provided with the hardware key portion 72, outside the display panel 73, for permitting the input of the information by the operator. On the other hand, the operating portion 200 shown in FIG. 10 is not provided with the hardware key portion 72, and an entire surface thereof is constituted by the display panel 73. That is, in this embodiment, the operating portion 200 may also be referred to as the display panel 73. Even in a constitution provided with the keys as in the operating portion 2, a constitution of a portion forming the display panel 73 and a constitution of the loop coil 26 are the same as those of the operating portion 200 of the key-less type shown in FIG. 10.

The operating portion 200 has a three-layer structure consisting of the display portion 2*a*, the operation input portion 2*b* and the loop coil 26. All these layers are constituted as an integrated member but may also be members separate from each other. From a surface side of the operating portion 200, the loop coil 26, the operation input portion 2*b* and the display portion 2*a* are disposed in the named order. Here, the display portion 2*a* may also be referred to as the display panel 73. The loop coil 26 is provided on a side closer to the surface of the operating portion 200 than the display portion 2*a* is. The "display surface" referred to herein means a surface where the operator sees the display portion 2*a*. Of the display portion 2*a*, a surface on a side seen by the operator is referred to as the display surface. Further, as shown in FIG. 10, the loop coil 26, the operation input portion 2*b* and the display portion 2*a* are disposed so as to overlap with each other with respect to a direction (perpendicular direction) perpendicular to the display panel 73. The "perpendicular direction" is a direction indicated by an arrow in FIG. 10.

The display portion 2*a* is a liquid crystal panel, for example. The display portion 2*a* and the operating panel microcomputer 2*d* which is not shown in FIG. 10 are electrically connected to each other. For connection, an unshown flexible flat cable (FFC) is used.

On the display portion 2*a*, i.e., on a side closer to the surface of the operating portion 200 than the display portion 2*a* is, the operation input portion 2*b* such as a touch panel is disposed. The operation input portion 2*b* as the touch panel in this embodiment is constituted by a touch surface for receiving contact of an object and by a touch sensor for detecting contact between an indicator and the touch surface and an input position by the indicator. The touch sensor may only be required to detect contact/non-contact between the indicator and the touch surface and a kind of the sensor does not matter. For example, the touch sensor is realized by a resistance sensor, a pressure sensor, an electrostatic capacity sensor, a photo-sensor or the like. In this embodiment, the touch sensor will be described as a touch sensor of four-wire resistance type. Further, the operation input portion 2*b* may also detect, as the contact, a state in which the object does not contact the operation input portion 2*b* and a distance therebetween is within a predetermined distance (for example, 5 mm).

The touch panel of the operation input portion 2*b* is provided with electrodes on four sides thereof, and each of the electrodes is connected to the operating panel microcomputer 2*d* through a connector such as a flexible printed circuit (FPC). On the operation input portion 2*b*, the loop coil 26 for the NFC is disposed. The operation input portion 2*b* and the loop coil 26 for the NFC are transparent (light-transmitting) films, so that the image displayed on the display portion 2*a* is visible from above the loop coil 26. A layer 260 is called an electrode layer 260 and is formed of a transparent base material, and includes the loop coil 260. The base material possesses a light-transmission property, and therefore, display of the display portion 2*a* is not blocked. Incidentally, this electrode layer 260 may also be formed integrally with a layer of the operation input portion 2*b* and may also be formed by a single layer. In this embodiment, a single loop coil 26 is disposed, but a plurality of loop coils 26 may also be disposed. The loop coil 26 and the base material are constituted so as to sufficiently transmit light (particularly visible light), and therefore, it is possible to visually recognizing information, displayed by the display portion 2*a*, through these loop coil 26 and base material. In this embodiment, the loop coil 26 and the base material are capable of transmitting about 90% of the visible light. However, as the light transmission property, it is not necessarily required to transmit 90% of the visible light, and as an index, about 60% or more is preferable. The loop coil 26 is also connected to the RF interface portion 24. The loop coil 26 is disposed so as to cover the operation input portion 2*b*, and therefore, sensitivity of communication with the portable terminal 6 is highest above the operation input portion 2*b*. For that reason, there is a need to induce the operator to hold the portable terminal (device) 6 over the operation input portion 2*b*.

Further, in this embodiment, the loop coil 26 is the transparent or semitransparent film, but is not limited thereto. For example, a thin wire-like electrode may also be disposed so as to be extended over the operation input portion 2*b*. This electrode is formed in a thin wire shape, and therefore, the electrode does not disturb viewability when the operator views the display portion 2*a*. By such a constitution, a structure and that the display portion 2*a* and the loop coil 26 are superposedly disposed with respect to a direction perpendicular to the surface of the display portion 2a may also be realized. In an example of this embodiment, from a surface side of the operating portion 200, the loop coil 26, the operation input portion 2b and the display portion 2a were disposed in the named order, but there is no need to dispose these members (portions) in the named order. For example, the loop coil 26 may also be disposed on a side back of the operation input portion 2b and the display portion 2a. However, in the case where a constitution in which the loop coil 26 is disposed on the back side of the operation input portion 2b and the display portion 2a is employed, a distance between the loop coil 26 and a finger of the operator touching the operation input portion 2b increases, and therefore, sensitivity of a touch operation lowers. For that reason, a constitution in which the loop coil 26 is disposed on a front side of the operation input portion 2b and the display portion 2a may preferably be employed.

(Display of Image on Display Panel)

Parts (a) and (b) of FIG. 11 are schematic views each for illustrating a screen displayed on the display panel 73 when the portable terminal 6 and the image forming apparatus 1 establish the NFC and the Wi-Fi communication. Part (a) of FIG. 11 is an example of a guide screen for guiding, for the operator, a position over which the operator holds the portable terminal 6, by displaying a mark (target mark 75) which is a sign for holding the portable terminal 6 over the target mark 75. This guide screen is displayed on the display panel 73, whereby the operator knows that there is a need to hold the portable terminal 7 over the display panel 73 in order to cause the image forming apparatus 1 to perform authentication of the portable terminal 6. Thus, in this embodiment, an entire screen displayed on the display panel 73 is switched, so that a screen on which the target mark 75 is displayed is displayed. However, the present invention is not limited to this embodiment, but for example, a constitution in which of the entire screen of the display panel 73, only a screen portion in the neighborhood of a center of the display panel 73 is switched may also be employed. Specifically, a constitution in which the screen is switched only at a portion where the target mark 75 is displayed and in which a screen corresponding to the background is not switched may also be employed. Also, in such a constitution, in this embodiment, the switching in the constitution is regarded as "switching of the guide screen".

On the other hand, part (b) of FIG. 11 shows a screen of the display panel 73 when the Wi-Fi communication between the portable terminal 6 and the image forming apparatus 1 is established. Here, the operating portion 2 of FIG. 11 is provided with the display panel 73, the hardware key portion 72 and an LED display portion 71. This operating portion 2 includes, in addition to the display panel 73, the hardware key portion 72 for permitting the operator to input information, and therefore, is not an operating portion of a so-called key-less type. The LED display portion 71 includes a plurality of lighting portions. Depending on a combination of a lighting position (place) and lighting, for example, whether an operation made of the image forming apparatus 1 is a power saving mode or a normal mode is discriminated. Further, abnormality of the image forming apparatus 1 such as the case where a jam occurred is also notified to the operator.

The display panel 73 is constituted by the display portion 2a, the operation input portion 2b and the loop coil 26. The operating portion 2 includes the hardware key portion 72 provided with hardware keys such as a start button, a stop button and a power saving button for shifting the operation made to the power saving mode and includes the LED display portion 71 for notifying the operator of an actuation state and occurrence or non-occurrence of an error. However, the number of the keys and an arrangement of the keys of the hardware key portion 72 are not limited to those shown in FIG. 11.

Further, as shown in FIG. 11, at a position below the hardware key portion 72, a shift button (switching) button 721 for restoring the operation mode of the image forming apparatus 1 from the power saving mode to the normal mode is provided. When the image forming apparatus 1 is in the power saving mode, the operator presses down the shift button 721, so that the operation state of the image forming apparatus 1 restores to the normal mode. This shift button 721 is also a kind of the hardware keys. Further, the shift button 721 is a button used in not only the case where the operation mode of the image forming apparatus 1 is switched from the power saving mode to the normal mode but also the case where the operation mode of the image forming apparatus 1 is switched from the normal mode to the power saving mode. Specifically, in the case where the image forming apparatus 1 is in the normal mode, when the operator presses down the shift schematic view 721, the operation mode of the image forming apparatus 1 shifts to the power saving mode. Accordingly, in the case of the image forming apparatus 1 provided with no human sensor, the operator presses down the shift button 721, so that the operation mode of the image forming apparatus 1 is switched between the power saving mode and the normal mode. Even in the case of the image forming apparatus 1 provided with the human sensor, some operator desires to turn off the human sensor. The image forming apparatus 1 in this embodiment is capable of switching the operation mode of the image forming apparatus 1 by turning off the human sensor and then by pressing down the shift button 721.

As shown in part (a) of FIG. 11, in this embodiment, when the image forming apparatus 1 requires the operator to perform authentication through the NFC, the target mark 75 (an example of the mark) which is a target for causing the operator to hold the portable terminal 6 over the target mark 75 is displayed on the display panel 73. This screen is the guide screen for guiding the position for causing the operator to hold the portable terminal 6 over the target mark 75. The mark which is the target (sign) is displayed on the display panel 73, whereby the operator knows a place over which the operator should hold the portable terminal 6 at first sight. The controller 3 sends an image signal for the target mark 75 to the display portion 2a such as the liquid crystal panel, so that the target mark 75 is displayed on the display portion 2a. In an example of part (a) of FIG. 11, the target mark 75 is displayed in the neighborhood of the center of the display panel 73, but may also be displayed at a position other than the center. Further, a shape of the target mark 75 is not limited to the shape of the target mark in this embodiment, but may also be any shape, figure or pattern capable of being recognized as a mark by the operator. Further, in this embodiment, only the target mark 75 is displayed on the display panel 73 as the guide screen for causing the operator to hold the portable terminal 6 over the target mark 75, but an icon other than the target mark 75 may also be displayed. Further, the guide screen may also be a guide screen for notifying the operator of that the operator is capable of holding the portable terminal 6 over the target mark 75 by displaying a message such as "HOLD TERMINAL OVER DISPLAY" or "HOLD TERMINAL HERE" or by displaying a message indicating a state of the image forming apparatus. In summary, the guide screen may only be required such that the position over which the operator should hold the portable terminal 6 is known as the display panel 73 by the operator.

When the operator holds the distance 6 over the NFC tag portion 4 and thus the portable terminal 6 of the operator is authenticated through the NFC, the Wi-Fi communication is started. When the Wi-Fi communication is started, the screen of the display panel 73 of the image forming apparatus 1 is switched to a screen of "DURING COMMUNICATION" as shown in part (b) of FIG. 11. By producing this display, the operator is capable of knowing that the Wi-Fi communication between the portable terminal 6 and the image forming apparatus 1 has been established.

(Display Timing and Non-Display Timing of Target Mark)

Next, timing when the display panel 73 displays the target mark 75 will be described.

The image forming apparatus 1 in this embodiment is operable in the normal mode and the power saving mode as an electric power mode (operation mode), and the power (operation) mode is capable of shifting to each of the normal mode and the power saving mode. The CPU 7 sets the power mode of the image forming apparatus 1 and carries out electric power control of the image forming apparatus 1. The normal mode is a made in which the image forming apparatus 1 operates in a state in which an image reading operation by the (image) reading portion and an image forming operation by the image forming portion 158 are enabled. The power saving mode is a mode in which the image forming apparatus 1 operates in a power saving state in which electric power consumption is smaller than the state of the normal mode. In the image forming apparatus 1 during the operation in the power saving mode, electric power is supplied to only the human sensor 160 or the CPU 7 which are devices necessary to restore from the power saving mode to the normal mode.

When a state in which the image forming apparatus 1 is not used continues for a predetermined time, the CPU 7 causes the power (operation) mode of the image forming apparatus 1 to shift from the normal mode to the power saving mode.

As timing when the display panel 73 displays the target mark 75, for example, timing when the power mode is restored from the power saving mode to the normal mode exists. The human sensor 160 outputs a detection signal on the basis of detection of a human. The controller 3 generates a restoring signal on the basis of the detection outputted from the human sensor 160. Then, on the basis of this restoring signal, the controller 3 switches the mode of the image forming apparatus 1 from the power saving mode to the normal mode. For example, on the basis of the restoring signal, the display portion 2a displays the target mark 75. By this, when the operator approaches the image forming apparatus 1, the target mark 75 is displayed on the display panel 73, and therefore, the operator can easily know the position over which the operator should hold the portable terminal 6. Incidentally, the display panel 73 may also display the target mark 75 in response to shift (restoration) of the mode of the image forming apparatus 1 from the power saving mode to the normal mode or in response to detection of the human by the human sensor 160.

Naturally, the image forming apparatus 1 is capable of restoring in power (operation) mode from the power saving mode to the normal mode. This is true for the image forming apparatus provided with no human sensor 160. The operating portion 2 is provided with, for example, a "sleep button". This "sleep button" is a button for shifting the mode of the image forming apparatus 1 from the normal mode to the power saving mode. After the operator ends the use of the image forming apparatus 1, the operator pressed down this "sleep button", so that the made of the image forming apparatus 1 immediately shifts to the power saving mode. Further, in the case where the image forming apparatus 1 is in the power saving mode, when the operator presses down the sleep button, the mode of the image forming apparatus 1 is restored from the power saving mode to the normal mode. At this timing, the display panel 73 displays the target mark 75. That is, the display panel 73 displays the target mark 75 in response to restoration of the mode of the image forming apparatus 1 from the power saving mode to the normal mode.

The timing when the display panel 73 displays the target mark 75 is not limited to the above-described timing. For example, the timing may also be timing when sheets are set on the image reading apparatus 152, timing when the human touches the display panel 73 or the like timing. Further, the image forming apparatus 1 is capable of being set so that the display panel 73 does not display the guide screen. This is because there is also a case that some operator does not need an authentication function by the portable terminal through the near field wireless communication.

FIG. 12 is a flowchart for illustrating a flow such that in this embodiment, the target mark 75 is displayed in response to restoration of the mode of the image forming apparatus 1 from the power saving mode to the normal mode. As a precondition, the image forming apparatus 1 is in a state of the power saving mode. Incidentally, in the flowchart of FIG. 12, a time when the CPU 7 recognizes a start of the detection of the human by the human sensor 160 is defined as a "START". Further, a time when the CPU 7 recognizes release of the Wi-Fi communication between the image forming apparatus 1 and the portable terminal 6 is defined as an "END". That is, this flow chart (FIG. 12) shows a control flow from the recognition by the CPU 7 of the start of the detection of the human by the human sensor 160 until the CPU 7 recognizes the release of the Wi-Fi communication between the image forming apparatus 1 and the portable terminal 6.

Even in the state of the power saving mode, the electric power is supplied to the CPU 7 and the human sensor 160. For that reason, the human sensor 160 is capable of detecting the human. In S1010, the CPU 7 discriminates whether or not the human sensor 160 continuously detects the human for a predetermined time. In other words, the CPU 7 measures a time in which the human sensor 160 continuously detects the human. When the time reaches 5 seconds, the step goes to S1011 which is a subsequent step of S1010. In this embodiment, the predetermined time is 5 seconds for example. Accordingly, when the human simply across the front side of the image forming apparatus 1, the human sensor 160 does not response. As long as the CPU 7 does not discriminate that the detection time of the human by the human sensor 160 has elapsed 5 seconds, the image forming apparatus 1 is continuously kept in the power saving mode.

In the case where the human sensor 160 continuously detects the human for the predetermined time, the step goes from S1010 to S1011. In S1011, the CPU 7 carries out control so that the mode of the image forming apparatus 1 shifts from the power saving mode to the normal mode. In this embodiment, in the power saving mode, the electric power is supplied to only the CPU 7 and the human sensor 160. On the other hand, in the normal mode, the electric power is also supplied to the operating portion 2, the reading portion 10, the wireless LAN communicating portion 5 and the like, so that electric power consumption is larger than the electric power consumption in the power saving mode.

In response to the restoration of the mode of the image forming apparatus 1 from the power saving mode to the normal mode, the step goes from S1011 to S1012. In S1012, the CPU 7 controls the display panel 73 so as to display the target mark 75. That is, in response to the discrimination of the mode of the image forming apparatus 1 from the power saving mode to the normal mode, the display panel 73 displays the target mark 75.

The operator holds the portable terminal 6 over the display panel 75 with the target mark 75, displayed on the display panel 73, as the target. Then, in S1013, whether or not the Wi-Fi communication between the portable terminal 6 and the image forming apparatus 1 is established is discriminated by the CPU 7. In the case where the CPU 7 does not discriminate that the Wi-Fi communication between the portable terminal 6 and the image forming apparatus 1 is not established, the step goes to S1014. The CPU 7 measures a time from display of the target mark 75 on the display panel 73, and in the case where a predetermined time has elapsed from the time, this flow is ended, so that the mode of the image forming apparatus 1 shifts to the power saving mode again.

On the other hand, in S1014, in the case where the CPU 7 discriminated that the predetermined time has not elapsed the time from the display of the target mark 75 on the display panel 73, the step returns to S1013 again. That is, as long as in S1013, the CPU 7 discriminated that the Wi-Fi communication is not established between the image forming apparatus 1 and the portable terminal 6 and does not discriminate that the predetermined time has elapsed from the display of the target mark 75 on the display panel 73, the CPU 7 provides an instruction to continue the display of the target mark 75 on the display panel 73. Here, in this embodiment, the predetermined time is 10 seconds. That is, in the case where after the display panel 73 displays the target mark 75, 10 seconds has elapsed from a start of measurement of the time by the CPU 7, unless the Wi-Fi communication between the image forming apparatus 1 and the portable terminal 6 is established, the CPU 7 causes the image forming apparatus 1 to shift in power mode to the power saving mode and turns off the display panel 73.

In S1013, in the case where the CPU 7 discriminated that the Wi-Fi communication between the portable terminal 6 and the image forming apparatus 1 is established, the CPU 7 switches the screen of the display panel 73 to the screen of "DURING COMMUNICATION" in S1015. Thereafter, as shown in S1016, the CPU 7 always monitors whether or not a state of the Wi-Fi communication is released. In the case where the CPU 7 discriminated that the state of the Wi-Fi communication is released, the flow of FIG. 12 ends. In other words, after the Wi-Fi communication is established, the screen of the display panel 73 is "DURING COMMUNICATION" until the Wi-Fi communication is released. By this, the operator views the display panel 73, and thus can easily know whether or not the portable terminal 6 and the image forming apparatus 1 are currently during the Wi-Fi communication.

FIG. 13 is a flowchart for illustrating timing when the target mark 75 displayed on the display panel 73 becomes non-display (disappears). Steps from S2001 to S2003 are similar to the steps from S1010 to S1012 described with reference to FIG. 12, and therefore, will be omitted from description. In the case where the operator holds the portable terminal over the display panel 73 and authentication of the operator is completed, the controller 3 causes the display panel 73 to display a main menu screen (S2004, S2006). The main menu screen will be described later.

Further, although the target mark 75 is displayed, in the case where the authentication is not performed for a certain time, the controller 3 turns off the screen of the display panel 73 (S2004, S2005). The step of S2005 is also similar to the step S1014 described with reference to FIG. 12, and therefore, will be omitted from description.

Part (a) of FIG. 14 is a schematic view showing an example of the main menu screen displayed on the display panel 73. As shown in part (a) of FIG. 14, on the main menu screen, for example, software keys (icons) such as "COPY", "SCAN", "FAX" and "SETTING". When the operator touches the "COPY" button, the screen is switched to a screen on which the operator selects a copy condition for using a copy function. Here, the screen on which the operator selects the copy condition is, for example, the screen as described above with reference to FIG. 9.

The "SCAN" button is a button for starting reading of an image printed on a sheet by the image reading apparatus 152. In a state in which the sheet is placed on the image reading apparatus, when the operator touches the "SCAN" button, the image reading apparatus starts the reading of the image on the sheet.

The "FAX" button is a button touched when a FAX function is used. For example, when this button is touched, the controller 3 causes the display panel 73 to display numerical (value) keys on the display panel 73. The operator inputs FAX (telephone) number by touching the numerical keys displayed on the display panel 73.

The "SETTING" button is a button for providing various settings of the image forming apparatus 1. The operator presses down the setting button and the step goes to a setting menu, so that the operator is capable of setting switching between on and off of the human sensor 160 and display or non-display of the target mark 75 when the mode of the image forming apparatus 1 restores from the power saving mode to the normal mode.

Part (b) of FIG. 14 shows a screen, on which the operator sets display or non-display of the target mark 75, which is a kind of a setting menu. The image forming apparatus 1 in this embodiment is also capable of causing the display panel 73 not to display a guide screen for displaying the target mark 75 at timing when the mode of the image forming apparatus 1 restores from the power saving mode to the normal mode. For example, in the case of the operator who does not use an authentication function using the portable terminal, when the guide screen is displayed on the display panel 73 every switching of the mode of the image forming apparatus 1 from the power saving mode to the normal mode, some operator thinks it troublesome. For that reason, in the image forming apparatus 1, the operator is capable of providing setting so that display of the guide screen is not produced. In the screen of part (b) of FIG. 14, when the operator touches "ON", the guide screen is set at display, and when the operator touches "OFF", the guide screen is set at non-display.

(Positional Relationship Between Display Panel and Loop Coil)

Parts (a) to (c) of FIG. 15 are schematic views each showing a positional relationship between the display panel 73 and the loop coil 26 (261, 262). Parts (a) and (b) of FIG. 15 are the schematic views when the operating portion 2 is seen from the front side of the operating portion 2 in a direction (perpendicular direction) perpendicular to the surface of the display panel 73. For simple explanation, a coil portion 261C (an example of an antenna coil) of the loop coil 261 and a coil portion 262C (an example of an antenna coil) of the loop coil 262 are shown by broken lines.

Part 8a) of FIG. 15 shows the operating portion 2 in which a part of the loop coil 261 overlaps with the display panel 73 with respect to the direction perpendicular to the surface of the display panel 73. Here, as shown in part (a) of FIG. 15, the loop coil 261 includes the coil portion 261C, a terminal 261A and a terminal 261B. The terminals 261A and 261B are electrically connected to an unshown substrate. The coil portion 261C includes a region overlapping with the display panel 73 and a portion non-overlapping with the display panel 73. The operator holds the portable terminal 6 over toward the target mark 75, and therefore, the coil portion 261C may only be required that a part thereof is provided so as to overlap with the display panel 73.

Part (b) of FIG. 15 is an example of the operating portion 2 in which an entire region of the coil portion 262c of the loop coil 262 overlaps with the display panel 73 with respect to the direction perpendicular to the surface of the display panel 73. Here, as shown in part (b) of FIG. 15, the loop coil 262 includes the coil portion 262C, a terminal 262A and a terminal 262B. The terminals 262A and 262B are electrically connected to an unshown substrate. Thus, the loop coil 262 may also be provided so that the entire region of the coil portion 262C overlaps with the display panel 73.

Part (c) of FIG. 15 is the schematic view for illustrating the positional relationship between the loop coil 262 and the display panel 73. An example of part (c) of FIG. 15 is an example in which the loop coil 262 is wired in a helical shape. In part (c) of FIG. 15, of the coil wired in the helical shape, a phantom line L extends along a left most side, a phantom line M extends along a rightmost side, a phantom line P extends along an uppermost side, and a phantom line Q extends along a lowermost side. In other words, along outermost sides of the coil wired in the helical shape, the phantom lines L, M, P and Q extend and are thus defined. Further, an intersection point between the phantom lines L and P is defined as A, an intersection point between the phantom lines M and P is defined as B, an intersection point between the phantom lines L and Q is defined as C, and an intersection point between the phantom lines M and Q is defined as D. Further, an intersection point between a line connecting the intersection points A and D and a line connecting the intersection points B and C is defined as O. When this intersection point O is defined as a center point of the loop coil 262, the center point O overlaps with the display panel 73. That is, the loop coil 262 is wired so that the center point operator overlaps with the display panel 73 with respect to a direction perpendicular to the surface of the display panel 73. An example of a preferred positional relationship between the loop coil 262 and the display panel 73 is as described above. The loop coil 262 is wired as in this example, so that when the operator holds the portable terminal 6 over the display panel 73, reception of the electromagnetic radiation, radiated from the NFC_R/W portion 36, by the NFC tag portion 4 and reception of the electromagnetic radiation, radiated from the NFC tag portion 4, by the NFC_R/W portion 36 are carried out with good sensitivity.

As described above, the positional relationship between the loop coil 262 and the display panel 73 may desirably be such that when corners A, B, C and D each constituted by outermost adjacent sides of the coil wired in the helical shape are defined, the intersection point O between a diagonal line AD and a diagonal line BC overlaps with the display panel 73. Further, when preferred winding of the loop coil 262 is considered, there is a way of thinking such that a region where a region enclosed by the loop coil 262 and the display panel 73 overlap with each other is increased to the extent possible. For example, in the example of part (c) of FIG. 15, the region enclosed by the loop coil 262 is defined by a region enclosed by the corners A, B, C and D (region ABCD). In this case, the loop coil 262 may preferably be provided so that the region ABCD overlaps with the display panel 73 in an area of ½ or more of the area of the region ABCD.

As regards the region enclosed by the loop coil 262, in the above, the region is defined as the region ABCD, but a region enclosed by an outermost coil portion of the loop coil 262, i.e., by an outer periphery of the coil may also be defined as the "region enclosed by the loop coil 262". An example in which the loop coil 262 is disposed so that ½ or more of this region overlaps with the display panel 73 is one of preferred examples.

Parts (a) to (c) of FIG. 16 are schematic views each for illustrating a positional relationship between the target mark 75 and the loop coil (coil portion) 263 (264, 265).

Part (a) of FIG. 16 shows a positional relationship between the target mark 75 and the coil portion 63. As shown in part (a) of FIG. 16, the display panel 73 displays the target mark 75 so as to be positioned inside loops of the coil portion 263 disposed in a loop shape. In this case, with respect to the direction perpendicular to the surface of the display panel 73, the target mark 75 and the coil portion 263 do not overlap with each other.

Part (b) of FIG. 16 showed the example in which the target mark 75 is disposed at a position where the target mark 75 does not overlap with the coil portion 263 and is displayed inside the loops of the coil portion 263 wired in the loop shape. On the other hand, part (b) of FIG. 16 is an example in which the target mark 75 is displayed so as to overlap with the coil portion 264. As in this modified example, a part of the target mark 75 may also overlap with the coil portion 264 with respect to the direction perpendicular to the surface of the display panel 73.

Part (c) of FIG. 16 shows an example in which the target mark 75 is disposed at a position where the target mark 75 does not overlap with the coil portion 265 and is displayed outside loops of the coil portion 265 wired in a loop shape. The display panel 73 may also display the target mark as in this modified example.

Embodiment 2

FIG. 17 is a schematic view for illustrating an example of a screen displayed by a display panel 73 in an embodiment 2. As shown in FIG. 17, the embodiment 2 is different from the embodiment 1, the display panel 73 displays a log-in icon 76 together with the target mark 75. The log-in icon 76 is an icon for manual log-in used for permitting the operator to manually log in. The target mark 75 and the log-in icon 76 are displayed on the same surface. In this embodiment, the target mark 75 and the log-in icon 76 are displayed while being arranged side by side in a direction perpendicular to both the direction (perpendicular direction) perpendicular to the surface of the display panel 73 and the vertical direction.

The log-in icon 76 is an icon used for permitting the operator to log in the image forming apparatus 1 when authentication to the image forming apparatus 1 through the NFC, such as the case where the operator who does not carry the portable terminal 6 using the NFC logs in the image forming apparatus 1 or the case where the loop coil 26 is broken or the like and thus the NFC is disabled or the like. When the operator presses down the log-in icon 76, the controller 3 detects pressing-down of the log-in icon 76 from coordinates of the log-in icon 76 through the operating panel microcomputer 2d. Then, the controller 3 changes a screen displayed on the display panel 73 to a "personal information input (entry) screen".

FIG. 18 is a screen displaying the "personal information input screen". The "personal information input screen" includes an ID input (entry) field 77 and a password input (entry) field 78, and when the operator touches these input fields, an unshown software numeric key screen is displayed on the display panel 73. The operator is capable of inputting an ID and a password for the log-in by using this software numeric key screen. The controller 3 discriminates whether or not the log-in of the operator to the image forming apparatus 1 is permitted from the inputted ID and password.

Further, an icon 79 for restoration is displayed so as to permit the operator to return to the authentication screen (the screen on which the target mark 75 is displayed) in the case where the operator erroneously touches the log-in icon 76. Incidentally, each of FIG. 18 and FIG. 19 shows an example of this embodiment, and an icon having another function may also be provided on the same surface and the display from may also be not the display form as in this example.

When the operator holds the portable terminal 6 over the target mark 75, there is a possibility such that the portable terminal 6 contacts the log-in icon 76 or such that a fingertip or the like of the operator touches the log-in icon 76. Then, before the authentication through the NFC is performed, the display screen of the display panel 73 shifts to the "personal information input screen". In this case, the operator is required to press down the icon 79 for restoration in order to perform the authentication through the NFC and thus takes time and effort. Therefore, the image forming apparatus 1 in this embodiment causes the display panel 73 to display the target mark 75 and the log-in icon 76 with a distance of about 40 mm.

It would be considered that of devices assumed to be utilized as the portable terminal 6, a smartphone is most frequently used. A width of the smartphone is about 80 mm in general. The operator intends to hold the portable terminal 6 over the target mark at a center position of the portable terminal 6, and therefore, in order to reduce a possibility of contact of the portable terminal 6 with the log-in icon 76, the distance from the center position of the target mark 75 to the log-in icon 76 may only be required to be 40 mm or more. Accordingly, in this embodiment, as shown in FIG. 19, with respect to the direction (left-right direction) perpendicular to both the direction perpendicular to the surface of the display panel 73 and the vertical direction, a distance L from the center of the target mark 75 to the log-in icon 76 is set at 40 mm.

By displaying the target mark 75 and the log-in icon 76 in such a manner, when the operator holds the tag data 6 over the target mark 75, a liability that the operator erroneously touches the log-in icon 76 can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-167789 filed on Sep. 13, 2019, which is hereby incorporated by reference herein in its entirety.

What is claimed is:

1. An image forming apparatus for authenticating a portable terminal by near field wireless communication with the portable terminal, said image forming apparatus comprising:
an image forming portion configured to form an image on a sheet; and
an operating portion configured to receive an operation by an operator,
wherein said operating portion includes a display panel capable of displaying information on image formation in response to authentication of the portable terminal and includes therein an antenna configured to establish the near field wireless communication with the portable terminal held over said display panel by said operator, said antenna being wired so as to overlap with said display panel with respect a perpendicular direction perpendicular to said display panel, and
wherein said display panel is capable of displaying a guide screen for guiding an operator so as to hold the portable terminal over said guide screen.

2. An image forming apparatus according to claim 1, wherein said antenna is provided on a display surface side of said display panel.

3. An image forming apparatus according to claim 2, further comprising art electrode layer on the display surface side of said display panel,
wherein said electrode layer includes a base material which has light transmission property and on which said antenna is formed.

4. An image forming apparatus according to claim 3, wherein said display panel and said electrode layer are integrally formed with each other.

5. An image forming apparatus according to claim 1, wherein said guide screen includes a mark which is a sign in said display panel over which said operator holds said portable terminal.

6. An image forming apparatus according to claim 1, wherein said operating portion is control displaying a log in icon for providing a manual log in by said operator without using the near field wireless communication.

7. An image forming apparatus according to claim 1, wherein said image forming apparatus is operable between a normal mode and a power saving mode smaller in electric power consumption than the normal mode,
wherein said image forming apparatus further comprises:
a human sensor which is a sensor for detecting a human and which is configured to output a detecting signal indicating detection of the human; and
a signal output unit configured to output a transfer signal for transferring an operation mode of said image forming apparatus from said power saving mode to said normal mode, and
wherein said display panel displays said guide screen depending on output of said transfer signal from said signal output unit.

8. An image forming apparatus according to claim 1, wherein said image forming apparatus is operable between a normal mode and a power saving mode smaller in electric power consumption than the normal mode,
wherein said operating portion includes a transfer key which is a hardware key to be pressed down by said operator for transferring an operation mode of said image forming apparatus from said power saving mode to said normal mode, and
wherein said display panel displays said guide screen depending on pressing down of said transfer key.

9. An image forming apparatus according to claim 1, wherein said display panel displays a main menu screen including icons to be pressed down by said operator for setting a copy condition of a copy function depending on the authentication.

10. An image forming apparatus according to claim 1, wherein when said display panel is seen along a perpendicular direction perpendicular to said display panel, said antenna is wired so as to form a loop through one full circumference or more.

11. An image forming apparatus according to claim 1, wherein said antenna is wired so that an entire region thereof with respect to a perpendicular direction perpendicular to said display panel overlap with said display panel with respect to the perpendicular direction.

12. An image forming apparatus according to claim 1, wherein said operating portion includes a hardware key configured to permit input of information to said image forming apparatus by said operator.

13. An image forming apparatus according to claim 1, wherein said guide screen includes a message prompting said operator to hold the portable terminal over said display panel.

14. An image forming apparatus according to claim 1, wherein a communication for authentication is executed in response to holding the portable terminal over said display panel.

\* \* \* \* \*